United States Patent [19]
Hagimoto et al.

[11] Patent Number: 6,010,427
[45] Date of Patent: Jan. 4, 2000

[54] ELECTRONICALLY CONTROLLED POWER SHIFT TRANSMISSION

[75] Inventors: Wataru Hagimoto, Kariya; Akitoshi Inaba, Okazaki, both of Japan

[73] Assignee: Aisin Seiki Kabushiki Kaisha, Kariya City, Japan

[21] Appl. No.: 08/921,525

[22] Filed: Sep. 2, 1997

[30] Foreign Application Priority Data

Aug. 30, 1996 [JP] Japan .................................. 8-230161
Sep. 27, 1996 [JP] Japan .................................. 8-256528
Aug. 29, 1997 [JP] Japan .................................. 9-233572

[51] Int. Cl.$^7$ .................................................. F16H 61/20
[52] U.S. Cl. .......................... 477/125; 477/126; 477/906
[58] Field of Search .................... 477/125, 126, 477/131, 906; 74/335

[56] References Cited

U.S. PATENT DOCUMENTS

| | | |
|---|---|---|
| 4,111,071 | 9/1978 | Pearce et al. ........................ 475/133 X |
| 4,898,050 | 2/1990 | Sakai ...................................... 477/38 X |
| 5,437,204 | 8/1995 | Person .................................. 477/125 X |
| 5,622,080 | 4/1997 | Furukawa ............................ 477/125 X |
| 5,649,880 | 7/1997 | Tsutsui et al. ........................... 477/125 |

*Primary Examiner*—Khoi Q. Ta
*Attorney, Agent, or Firm*—Burns, Doane, Swecker & Mathis, LLP

[57] ABSTRACT

An electronically controlled power shift transmission for a vehicle includes an oil pressure source which generates oil pressure, a clutch which is adapted to be engaged to move the vehicle when oil pressure is supplied to the clutch, a shift valve which is movable between a first position in which oil pressure is supplied to the clutch and a second position in which oil pressure to the clutch is cut off, and a solenoid valve for changing the position of the shift valve. The shift valve drains the oil pressure in the clutch when the shift valve cuts off the oil pressure supplied to the clutch.

14 Claims, 19 Drawing Sheets

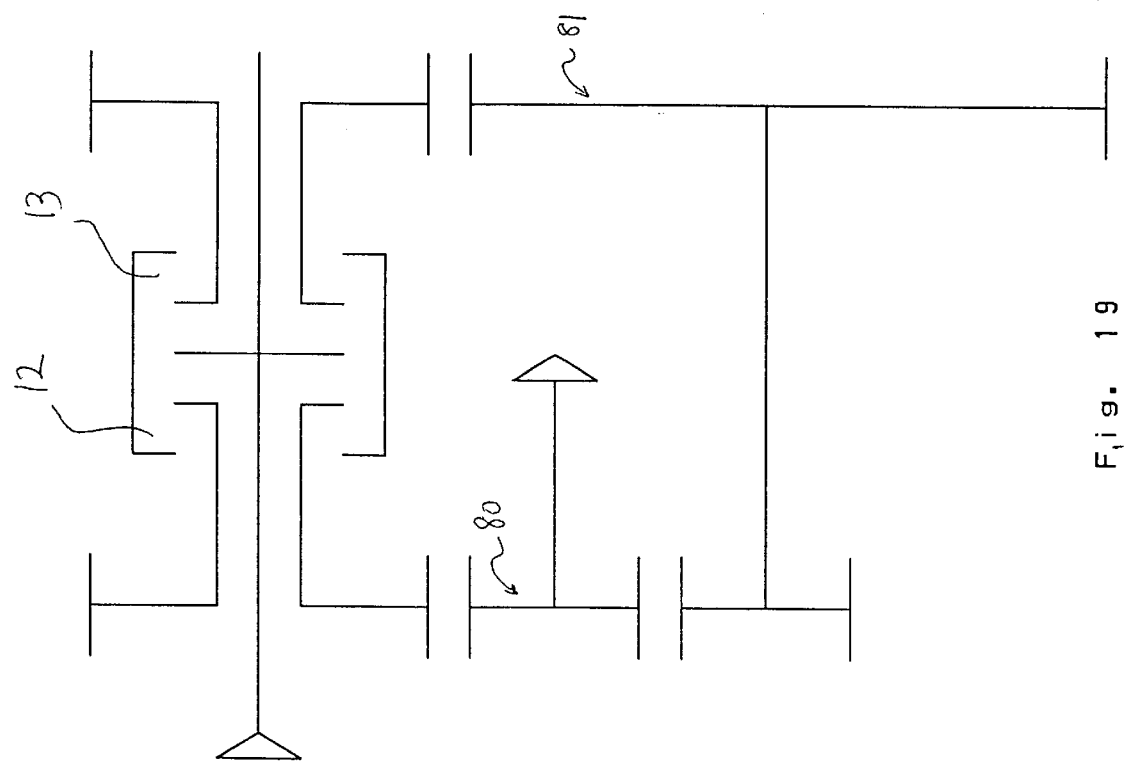

ELECTRONICALLY CONTROLLED POWER SHIFT TRANSMISSION

FIELD OF THE INVENTION

The present invention generally relates to transmissions. More particularly, the present invention pertains to an electronically controlled power shift transmission, including a fail safe system for a shift valve.

BACKGROUND OF THE INVENTION

In forklift type vehicle, the position of the shift lever is detected electrically, and the power shift transmission shifts in the forward and reverse manner by using the detected electrical signals. With reference to FIG. 9 which illustrates an oil pressure circuit of a known power shift transmission, when the driver changes the shift lever from the forward position to the reverse position, the power shift transmission detects the shift change by electrical signals, and the solenoid valves 1, 2 are controlled to move the shift valve 3. When the shift valve 3 moves, the supply of line pressure in the oil pressure circuit changes from the front clutch to the rear clutch 4, and the vehicle thus changes movement from the forward direction to the reverse direction.

When the shift lever is shifted into the neutral position, but the shift valve 3 sticks at the position where the shift valve 3 supplies oil pressure to the front clutch 5 and cuts off oil pressure to the rear clutch 4, oil pressure is supplied to the front clutch 5, regardless of the position of the shift lever.

In the situation where the shift valve 3 sticks at the position where the shift valve 3 cuts off oil pressure supplied to the front clutch 5 and supplies oil pressure to the rear clutch 4, oil pressure is supplied to the rear clutch 4 regardless of whether the shift lever is in the neutral position or the forward position. Therefore, in the situation where the shift valve 3 sticks in the manner mentioned above, oil pressure is supplied to a clutch opposite or different from the shift lever position.

SUMMARY OF INVENTION

A need exists, therefore, for an electronically controlled power shift transmission which overcomes the above drawbacks.

To address this need the present invention provides an electronically controlled power shift transmission for a vehicle that includes an oil pressure source for generating oil pressure, an engageable clutch for moving the vehicle when the oil pressure is supplied from the oil pressure source, a shift valve which is movable between a first position for supplying the oil pressure to the clutch and a second position for cutting off the oil pressure to the clutch, and a solenoid valve for changing the shift valve between the first and second positions. The shift valve drains the oil pressure in the clutch when the shift valve cuts off oil pressure supplied to the clutch.

According to another aspect of the invention, an electronically controlled power shift transmission for a vehicle includes an oil pressure source for generating oil pressure, a clutch which is engageable when the oil pressure is supplied from the oil pressure source to move the vehicle, a shift valve that is shiftable between a first position for supplying the oil pressure to the clutch and a second position for cutting off the oil pressure to the clutch, a solenoid valve for changing the position of the shift valve between the first and second positions, and a safety valve for controlling the oil pressure to prevent engagement of the clutch when the shift valve is in the second position.

In accordance with another aspect of the invention, an electronically controlled power shift transmission for a vehicle includes an oil pressure source for generating oil pressure, a front clutch which is engageable to move the vehicle in a forward direction when oil pressure higher than a predetermined pressure is supplied to the front clutch, a rear clutch which is engageable to move the vehicle in a reverse direction when oil pressure higher than a predetermined pressure is supplied to the rear clutch, a front shift valve which is switchable between a first position in which the oil pressure from the oil pressure source is supplied to the front clutch and the oil pressure in the rear clutch is drained, and a second position in which oil pressure supply to the front clutch is cut off, and a rear shift valve which is switchable between a first position in which the oil pressure is supplied to the rear clutch and the oil pressure in the front clutch is drained, and a second position in which oil pressure supply to the rear clutch is cut off. The transmission also includes a front solenoid valve which switches the front shift valve between the first position and the second position, and a rear solenoid valve which switches the rear solenoid valve between the first position and the second position.

BRIEF DESCRIPTION OF THE DRAWING FIGURES

Additional features and details of the present invention will become more apparent from the following detailed description considered with reference to the accompanying drawing figures in which like reference numerals designate like elements and wherein:

FIG. 19 is a schematic illustration of the gear train of the clutch for a vehicle.

DESCRIPTION OF THE PREFERRED EMBODIMENTS

Figure 1:
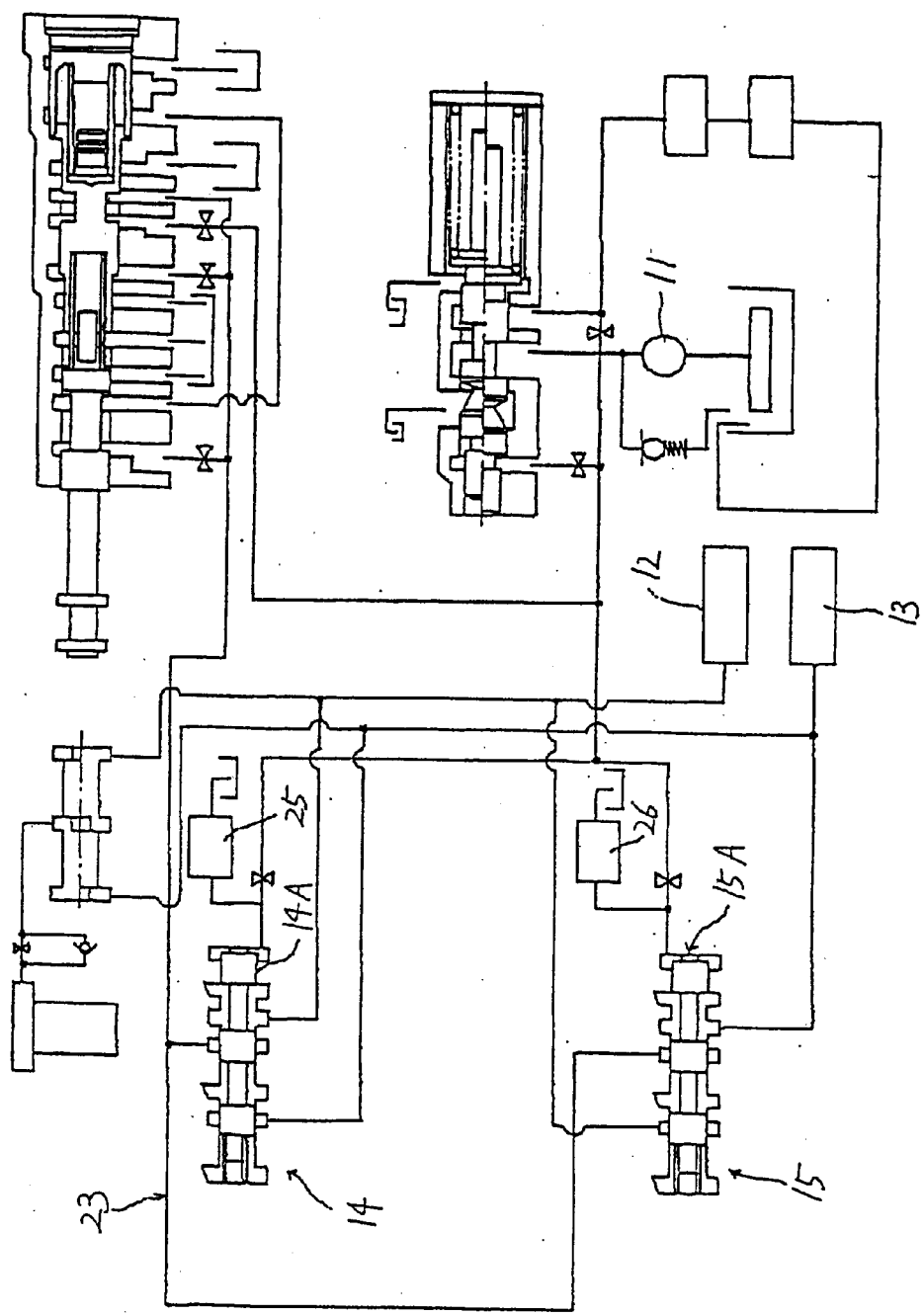
FIG. 1 is a circuit diagram of an electronically controlled power shift transmission according to a first embodiment of the present invention.
Figure 2:
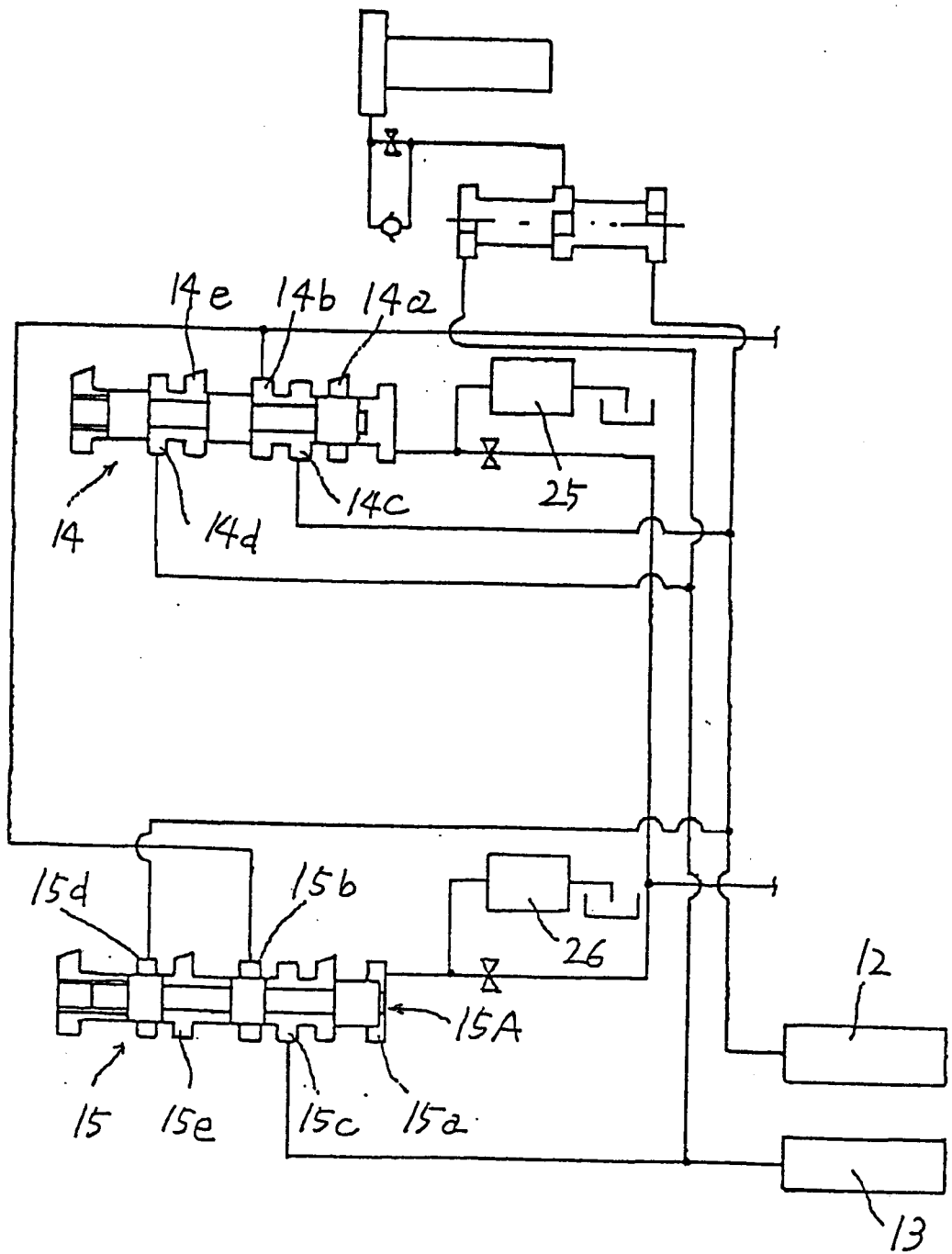
FIG. 2 is a circuit diagram of a portion of the electronically controlled power shift transmission illustrated in FIG. 1 showing one condition of the transmission.
Figure 3:
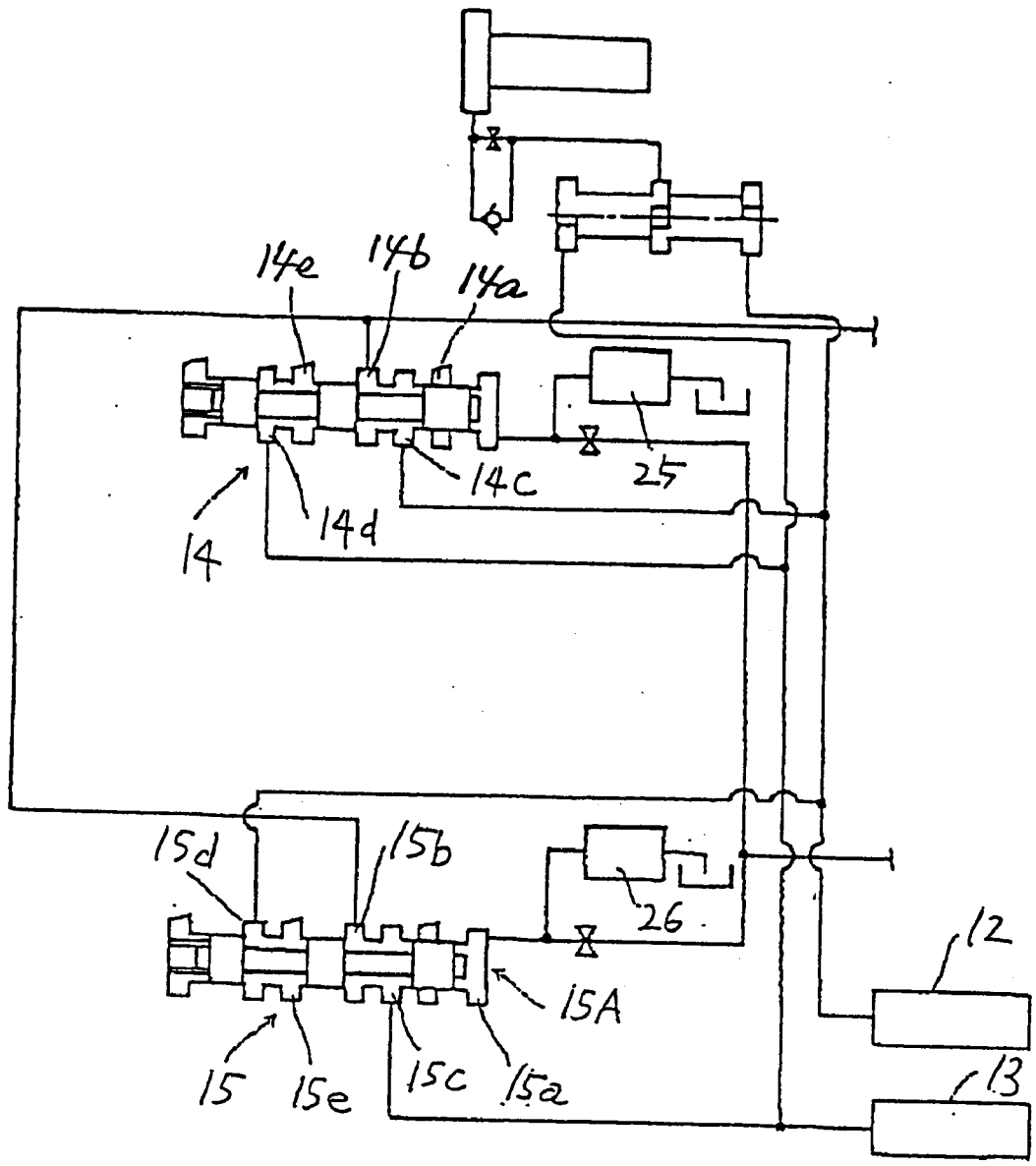
FIG. 3 is a circuit diagram of a portion of the electronically controlled power shift transmission illustrated in FIG. 1 showing another condition of the transmission.
Figure 4:
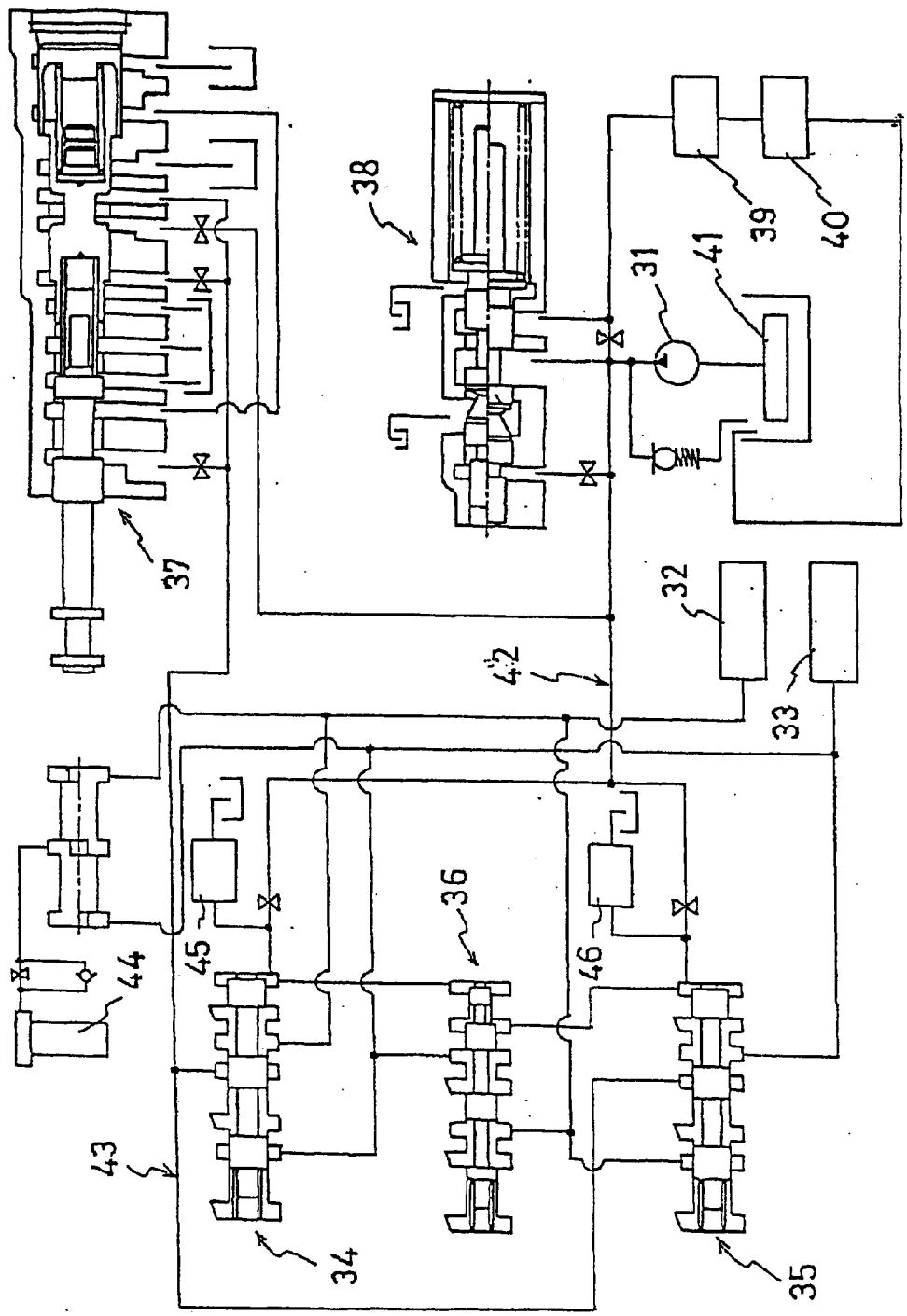
FIG. 4 is a circuit diagram of an electronically controlled power shift transmission according to a second embodiment of the present invention.
Figure 18:
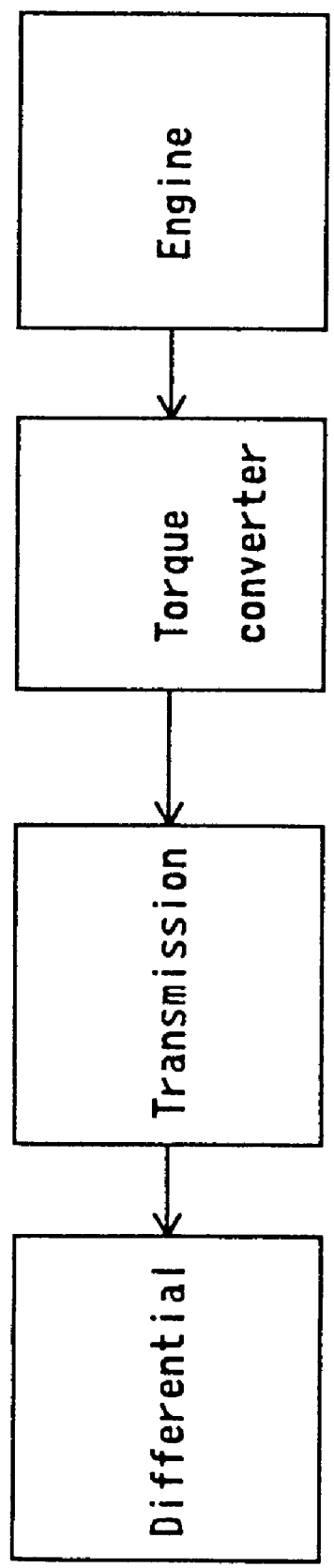
FIG. 18 is a block diagram showing the transmission route of the drive power.

Reference is initially made to FIGS. 1–3 which illustrate the oil pressure circuit of a first embodiment of an electronically controlled power shift transmission in accordance with the present invention. The transmission can be used, for example, in a forklift. In this first embodiment, the forklift is provided with forward, neutral, and reverse shift positions. Also, FIG. 18 illustrates the transmission route of the drive power from the engine. In this embodiment, the drive power is transmitted from the engine to the differential through a torque converter and a transmission.

As seen in FIGS. 1–3, the power shift transmission has a shift lever (not shown) for changing the shift position, an oil pump 11, a clutch that includes a front clutch 12 and a rear clutch 13, a front shift valve 14, and a rear shift valve 15.

The oil pump 11 is adapted to generate oil pressure. The front clutch 12 is engaged through the supply of oil pressure from the oil pump 11 to move the vehicle in the forward direction. Similarly, the rear clutch 13 is engaged through the supply of oil pressure from the oil pump 11 to move the vehicle in the reverse direction.

The front shift valve 14 is designed to supply or cut off oil pressure from the oil pump 11 to the front clutch 12 through operation of a front solenoid valve 25. Likewise, the rear shift valve 15 is adapted to supply or cut off oil pressure from the oil pump 11 to the rear clutch 13 through operation of a rear solenoid valve 26.

The pressure in line 23 that circulates in the power shift transmission is generated by the oil pressure supplied from the oil pump 11 and passes through an inching valve 17. The pilot oil pressure 22 is generated by the oil which is filtered by a strainer 21, is pumped out by the pump 11, and is passed through a regulator valve 18. An accumulator 24 is also provided to suppress vibration of the oil pressure. Oil pressure in a torque converter 39 is drained through a cooler 40 and is then pumped out again.

As seen with reference to FIG. 19 which shows the gear train of the clutches 12, 13, when oil pressure is supplied to the front clutch 12, the front clutch 12 is engaged so that the output gear 80 which connects with the differential device (not specifically shown in FIG. 19) transmits the drive power through the output gear 80 to move the vehicle in the forward direction. When oil pressure is supplied to the rear clutch 13, the clutch 13 is engaged so that the output gear 80 which connects with the differential device transmits the drive power through the reverse gear 81 to move the vehicle in the reverse direction.

With reference once again to FIGS. 1–3, the front shift valve 14 is a spool valve which switches between a first position for supplying oil pressure to the front clutch 12 and a second position for cutting off oil pressure to the front clutch 12. The front shift valve 14 includes a valve body 14A that is pressed or urged by a spring so that the front shift valve 14 is in the second position. The front shift valve 14 also includes a front oil chamber 14a which is able to supply or cut off the pilot oil pressure from the oil pump 11 by operation of the front solenoid valve 25, a first front port 14b which supplies the line pressure 23 to circulate in the power shift transmission, and a second front port 14c which connects with the front clutch 12.

The rear shift valve 15 is also a spool valve which switches between a first position for supplying oil pressure to the rear clutch 13 and a second position for cutting off oil pressure to the rear clutch 13. The rear shift valve 15 includes a valve body 15A that is pressed by a spring so that the rear shift valve 15 is in the second position. The rear shift valve 15 also includes a rear oil chamber 15a which is able to supply or cut off the pilot oil pressure from the oil pump 11 by operation of the rear solenoid valve 26, a first rear port 15b which supplies the line pressure 23 to circulate in the power shift transmission, and a second rear port 15c which connects with the rear clutch 13. In this embodiment, the solenoid valve 25, 26 are normally open solenoid valves.

The following table 1 shows the relationship between the position of the shift lever, the shift valves 14, 15, and the solenoid valves 25, 26.

TABLE 1

|  | shift position | | | shift valve | | solenoid valve | | movement | | |
| --- | --- | --- | --- | --- | --- | --- | --- | --- | --- | --- |
|  | F | N | R | F | R | F | R | F | N | R |
| normal condition | ● |   |   | ○ | X | ○ | X | ● |   |   |
|   |   | ● |   | X | X | X | X |   | ● |   |
|   |   |   | ● | X | ○ | X | ○ |   |   | ● |
| abnormal condition | ● |   |   | s○ | X | ○ | X | ● |   |   |
|   |   | ● |   | s○ | X | X | X |   | ● |   |
|   |   |   | ● | s○ | ○ | X | ○ |   | ● |   |
|   | ● |   |   | sX | X | ○ | X |   | ● |   |
|   |   | ● |   | sX | X | X | X |   | ● |   |
|   |   |   | ● | sX | ○ | X | ○ |   |   | ● |
|   | ● |   |   | ○ | s○ | ○ | X |   | ● |   |
|   |   | ● |   | X | s○ | X | X |   | ● |   |
|   |   |   | ● | X | s○ | X | ○ |   |   | ● |
|   | ● |   |   | ○ | sX | ○ | X | ● |   |   |
|   |   | ● |   | X | sX | X | X |   | ● |   |
|   |   |   | ● | X | sX | X | ○ |   | ● |   |

In Table 1, F refers to the forward position, N refers to the neutral position, and R refers to the reverse position. In the column showing the shift valve conditions, ○ represents the first position of the shift valves, X represents the second position of the shift valves, s○ represents when sticking of the shift valve occurs in the first position, and sX represents when sticking of the shift valve occurs in the second position. In the column showing the solenoid valve conditions, ○ represents the turned on condition while X represents the turned off condition.

The operation of the power shift transmission described above is as follows. When the shift lever is in the neutral position, the front solenoid valve 25 and the rear solenoid valve 26 operate to drain the pilot oil pressure from the oil pump 11. During this time, the condition of each shift valve is shown in Table 1.

When the position of the shift lever changes from neutral to forward, the front solenoid valve 25 operates so that the pilot oil pressure 22 is supplied to the front shift valve 14, and the rear solenoid valve 26 operates so that the pilot oil pressure is drained. The front shift valve 14 shifts as shown in FIG. 2 by operation of the front oil chamber 14a. In the condition illustrated in FIG. 2, the front clutch 12 is engaged when the pressure exceeds a predetermined pressure by supplying the line pressure 23 to the front clutch 12 through the front shift valve 14. As a result, the vehicle moves forward.

When the position of the shift lever changes from neutral to reverse, the rear solenoid valve 26 operates so that the pilot oil pressure 22 is supplied to the rear shift valve 15, and the front solenoid valve 25 drains the pilot oil pressure 22. The pilot oil pressure 22 flows into the rear oil chamber 15a, and only the rear shift valve 15 moves to the first position. In this condition, the line pressure 23 is supplied to the rear clutch 13 through the rear shift valve 15, and the rear clutch 13 is engaged through the application of oil pressure exceeding a predetermined pressure. As a result, the vehicle moves in the reverse direction.

When the position of the shift lever changes from neutral to reverse in a condition in which the front shift valve 14 is stuck in the first position, the front solenoid valve 25 is turned off, the rear solenoid valve 26 is turned on and the pilot oil pressure 22 flows to the rear oil chamber 15a of the rear shift valve 15 so that the rear shift valve 15 moves to the first position. However, the front shift valve 14 is positioned in the first position, and so the shift valves 14, 15 operate in the manner shown in FIG. 3. In this condition shown in FIG. 3, the oil pressure in the rear clutch 13 is drained to the drain port 14e through the port 14d. Additionally, the oil pressure being supplied to the front clutch 12 from the second front port 14c is drained to the drain port 15e through the port 15d. The vehicle thus maintains the neutral condition because the oil pressure supplied from the second front port 14c to the front clutch 12 is drained to the drain port 15e through the port 15d. As a result, the front clutch 12 and rear clutch 13 do not engage at the same time in spite of the front shift valve 14 being stuck in the first position. That is, a double lock of the clutches 12, 13 does not occur.

When the position of the shift lever changes from neutral to forward under a condition in which the front shift valve 14 is stuck in the second position, the front solenoid valve 25 is turned on and the rear solenoid valve 26 is turned off. The oil pressure is supplied to the front oil chamber 14a, but the front shift valve 14 cannot move from the second position. In this situation, the condition of both shift valves 14, 15 is shown in FIG. 1. In FIG. 1, the line pressure 23 is not supplied to the front clutch 12 and the rear clutch 13 because the first front port 14b is not connected with the second front port 14c, and the first rear port 15b is not connected with the second rear port 15c. Thus, the movement of the vehicle becomes neutral.

When the shift lever changes to the reverse position in this condition, the rear solenoid valve 26 is turned on and the pilot oil pressure 22 is supplied to the rear oil chamber 15a. Therefore, the line pressure 23 is supplied to the rear clutch 13. Because the front shift valve 14 does not move from the second position, the oil pressure in the rear clutch 13 cannot be drained from the drain port 14e. The oil pressure in the rear clutch 13 thus exceeds a predetermined pressure and the vehicle moves in the reverse direction.

FIGS. 4–8 illustrate an oil pressure circuit according to a second embodiment of the present invention. In this second embodiment, the oil pressure circuit is adapted to be used in a vehicle such as a forklift that is provided with forward, neutral and reverse shift positions.

The power shift transmission has a shift lever (not shown) which is adapted to change the shift position, an oil pump 31, a front clutch 32, a rear clutch 33, a front shift valve 34, a rear shift valve 35, and a safety valve 36.

The oil pump 31 is adapted to generate oil pressure. The front clutch 32 is engaged through the supply of oil pressure to move the vehicle in the forward direction, and the rear clutch 33 is engaged through the supply of oil pressure to move the vehicle in the reverse direction. The front shift valve 34 is able to supply or cut off oil pressure from the oil pump 31 to the front clutch 32 by operation of a front solenoid valve 45. The rear shift valve 35 is able to supply or cut off oil pressure from the oil pump 31 to the rear clutch 33 through operation of a rear solenoid valve 46. The condition of the safety valve 36 is determined in accordance with the condition of the shift valves and the solenoid valves, and the safety valve 36 is designed to drain the oil pressure. The line pressure 43 that circulates in the power shift transmission is generated by the oil pressure from the oil pump 31 passing through an inching valve 37. The pilot oil pressure 42 is generated by the oil which is filtered by a strainer 41, pumped out by the pump 31 and passed through a regulator valve 38. An accumulator 44 is provided to suppress vibration in the oil pressure.

The front shift valve 34 is a spool valve which switches between a first position in which oil pressure is supplied to the front clutch 32 and a second position in which oil pressure to the front clutch 32 is cut off. The front shift valve 34 includes a valve body 34A, and this valve body 34A is pressed by a spring so that the front shift valve 34 is in the second position. The front shift valve 34 also includes a front oil chamber 34a which is able to supply or cut off the pilot oil pressure from the oil pump 31 by operation of the front solenoid valve 45, a first front port 34b which supplies the line pressure 43 to circulate in the power shift transmission, and a second front port 34c which is connected to the front clutch 32. Drain ports 34e, 34f are also provided in the front shift valve 34.

The rear shift valve 35 is also in the form of a spool valve which switches between a first position in which oil pressure is supplied to the rear clutch 33 and a second position in which oil pressure to the rear clutch 33 is cut off. The rear shift valve 35 includes a valve body 35A that is pressed or urged by a spring so that the rear shift valve 35 is in the second position. The rear shift valve 35 also includes a rear oil chamber 35a which is able to supply or cut off the pilot oil pressure from the oil pump 31 by operation of the rear solenoid valve 46, a first rear port 35b which supplies the line pressure 43 so that the line pressure circulates in the power shift transmission, and a second rear port 35c which is connected to the rear clutch 33.

The safety valve 36 is in the form of a spool valve that is provided with a safety oil chamber 36a connected to the front oil chamber 34a of the front shift valve 34, a first safety port 36b connected to the front clutch 32, a second safety port 36c connected to the rear clutch 33, and drain ports 36d, 36e for draining the oil pressure. The safety valve 36 is disposed in parallel with the shift valves 34, 35. When the front solenoid valve 45 or the rear solenoid valve 46 operates so that the oil pressure is not supplied to the front oil chamber 34a or the rear oil chamber 35a, the first safety port 36b connects with the drain port 36e, and the second safety port 36c connects with the drain port 36d. When the front solenoid valve 45 or the rear solenoid valve 46 operates so that the oil pressure is supplied to the front oil chamber 34a or the rear oil chamber 35a, the connection between the first safety port 36b and the drain port 36e is cut off, and the connection between the second safety port 36c and the drain port 36d is also cut off. The valve body 36A is pressed or urged by a spring so that the oil pressure in the clutches 32, 33 is drained when oil pressure is not supplied to the safety oil chamber 36a. In this embodiment, the solenoid valve 45, 46 are normally open solenoid valves.

Table 2 below shows the relationship between the position of the shift lever, the shift valves 34, 35, the safety valve 36, and the solenoid valves 45, 46 during operation of the embodiment of the present invention shown in FIGS. 4–8.

TABLE 2

| | shift position | | | shift valve | | solenoid valve | | safety valve | movement | | |
|---|---|---|---|---|---|---|---|---|---|---|---|
| | F | N | R | F | R | F | R | | F | N | R |
| normal condition | ● | | | ○ | X | ○ | X | ○ | ● | | |
| | | ● | | X | X | X | X | X | | ● | |
| | | | ● | X | ○ | X | ○ | ○ | | | ● |
| abnormal condition | ● | | | s○ | X | ○ | X | ○ | ● | | |
| | | ● | | s○ | X | X | X | X | | ● | |
| | | | ● | s○ | ○ | X | ○ | ○ | | | ● |
| | ● | | | sX | X | X | ○ | X | ● | | |
| | | ● | | sX | X | X | X | X | | ● | |
| | | | ● | sX | ○ | X | ○ | ○ | | | ● |
| | ● | | | ○ | s○ | ○ | X | ○ | ● | | |
| | | ● | | X | s○ | X | X | X | | ● | |
| | | | ● | X | s○ | X | ○ | ○ | | | ● |
| | ● | | | ○ | sX | ○ | X | ○ | ● | | |
| | | ● | | X | sX | X | X | X | | ● | |
| | | | ● | X | sX | X | ○ | ○ | | | ● |

In the column illustrating the safety valve conditions, ○ represents the first position of the safety valve 36 while X represents the second position of the safety valve 36. The other nomenclature used in Table 2 is the same as that used in Table 1.

The operation of the power shift transmission according to the embodiment illustrated in FIGS. 4–8 is described below. When the shift lever is in the neutral position, the front solenoid valve 45 and the rear solenoid valve 46 operate to drain the pilot oil pressure from the oil pump 31. The condition of each of the shift valves 34, 35 is shown in Table 2.

When the position of the shift lever is changed from neutral to forward, the front solenoid valve 45 operates so that the pilot oil pressure 42 is supplied to the front shift valve 34, and the rear solenoid valve 46 operates so that the pilot oil pressure is drained. Then the pilot oil pressure 42 flows into the front oil chamber 34a and the safety oil chamber 36a, and the front shift valve 34 and the safety valve 36 shift to the condition shown in FIG. 5 by operation of the front oil chamber 34a and the safety oil chamber 36a. In the condition illustrated in FIG. 5, the front clutch 32 is engaged by supplying the line pressure 43 to the front clutch 32 through the front shift valve 34. As a result, the vehicle moves in the forward direction.

Figure 5:
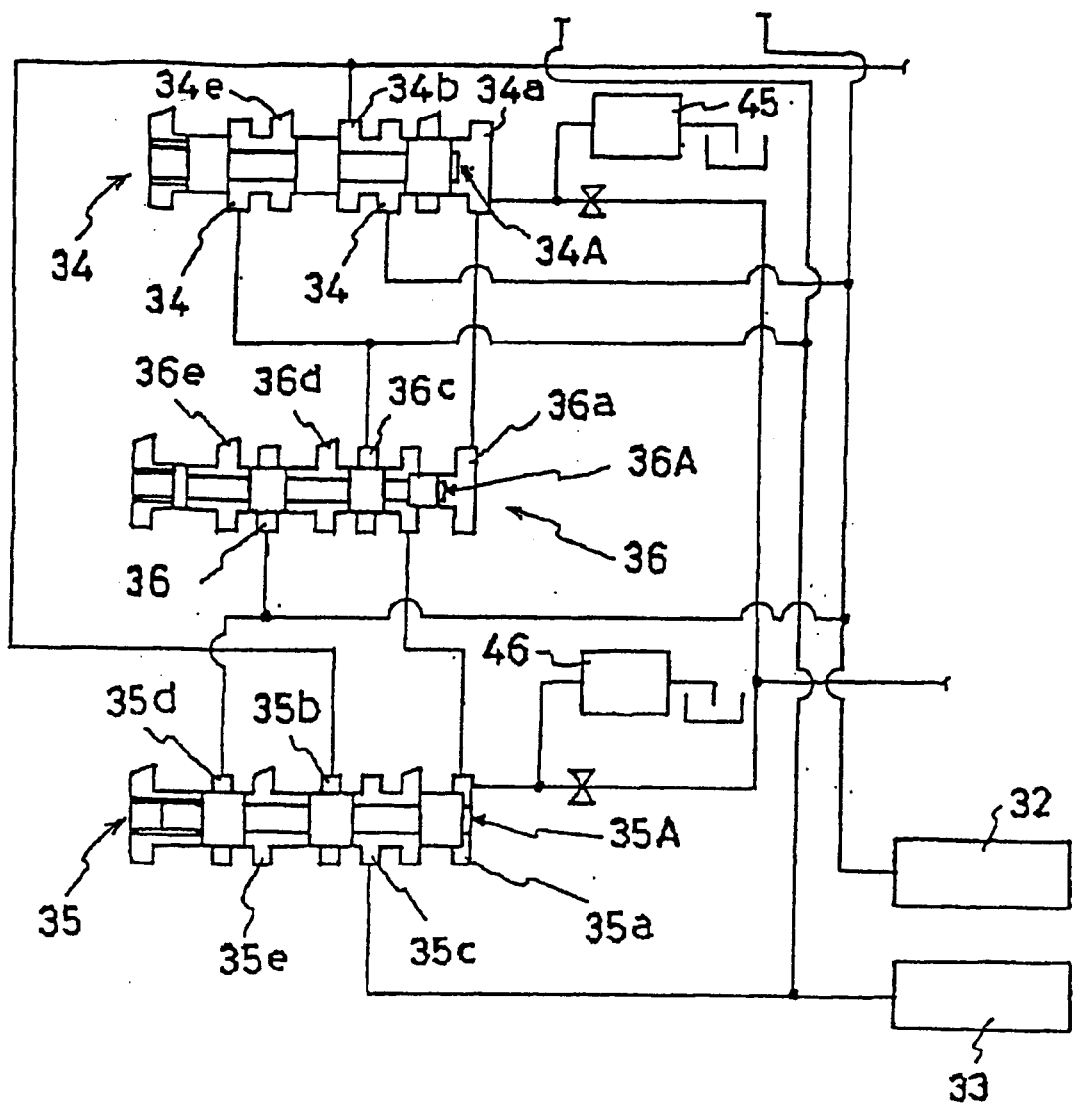
FIG. 5 is a circuit diagram of a portion of the electronically controlled power shift transmission illustrated in FIG. 4 showing one condition of the transmission.
Figure 10:
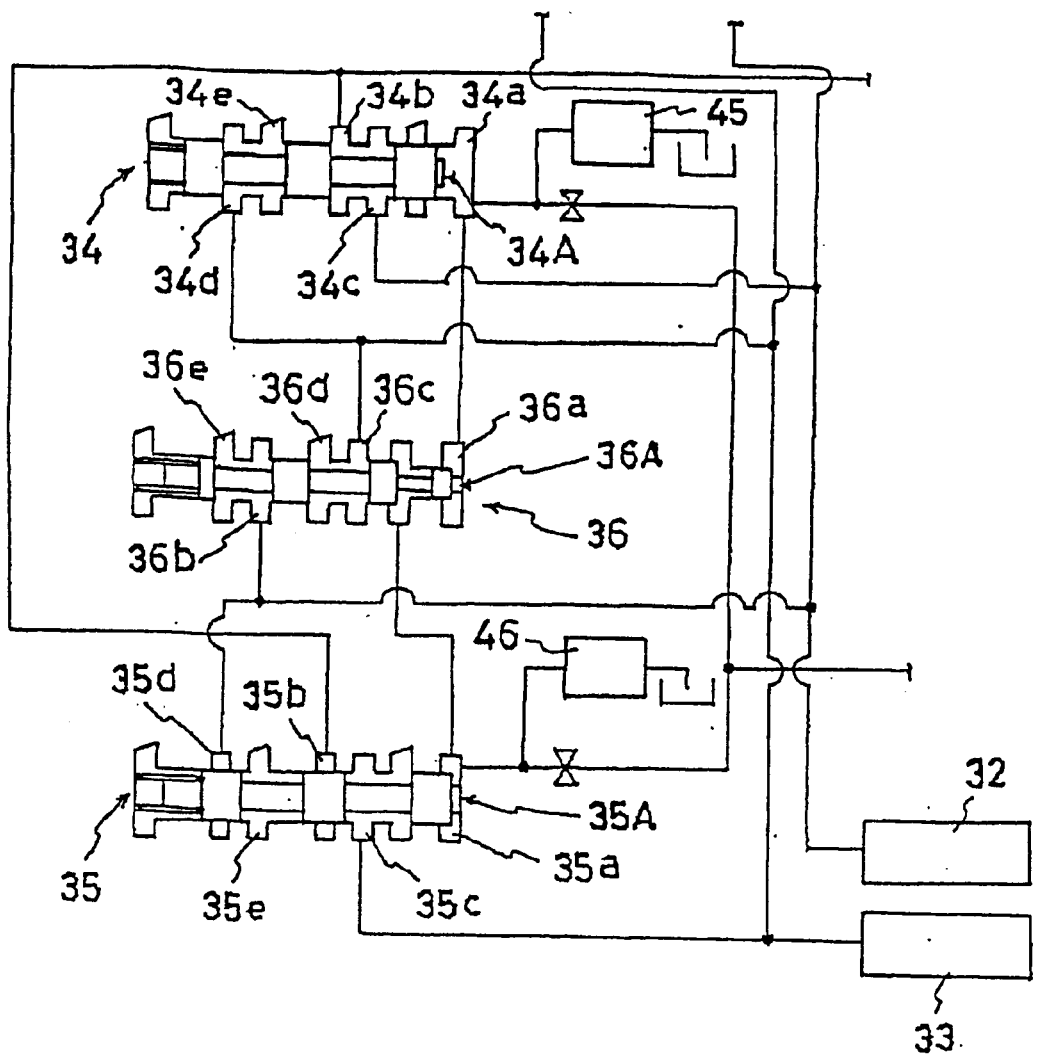
FIG. 10 is a circuit diagram of a portion of the electronically controlled power shift transmission shown in FIG. 4 showing another condition of the transmission.

In the situation where the front shift valve 34 sticks in the condition illustrated in FIG. 5, the front solenoid valve 45 turns off when the shift lever changes from the neutral position to the forward position. The front shift valve 34 cannot move back to the second position from the first position, although the safety valve 36 which does not stick goes back because the pilot oil pressure 42 from the front oil chamber 34a is drained. This condition is shown in FIG. 10. In FIG. 10, oil pressure is not supplied to the front clutch 32 because the line pressure 43 is drained to the drain port 36e of the safety valve 36 through the front shift valve 34. Therefore, the vehicle is in the neutral position. As a result, the vehicle does not move forward even if the front shift valve 34 sticks in the first position.

Figure 7:
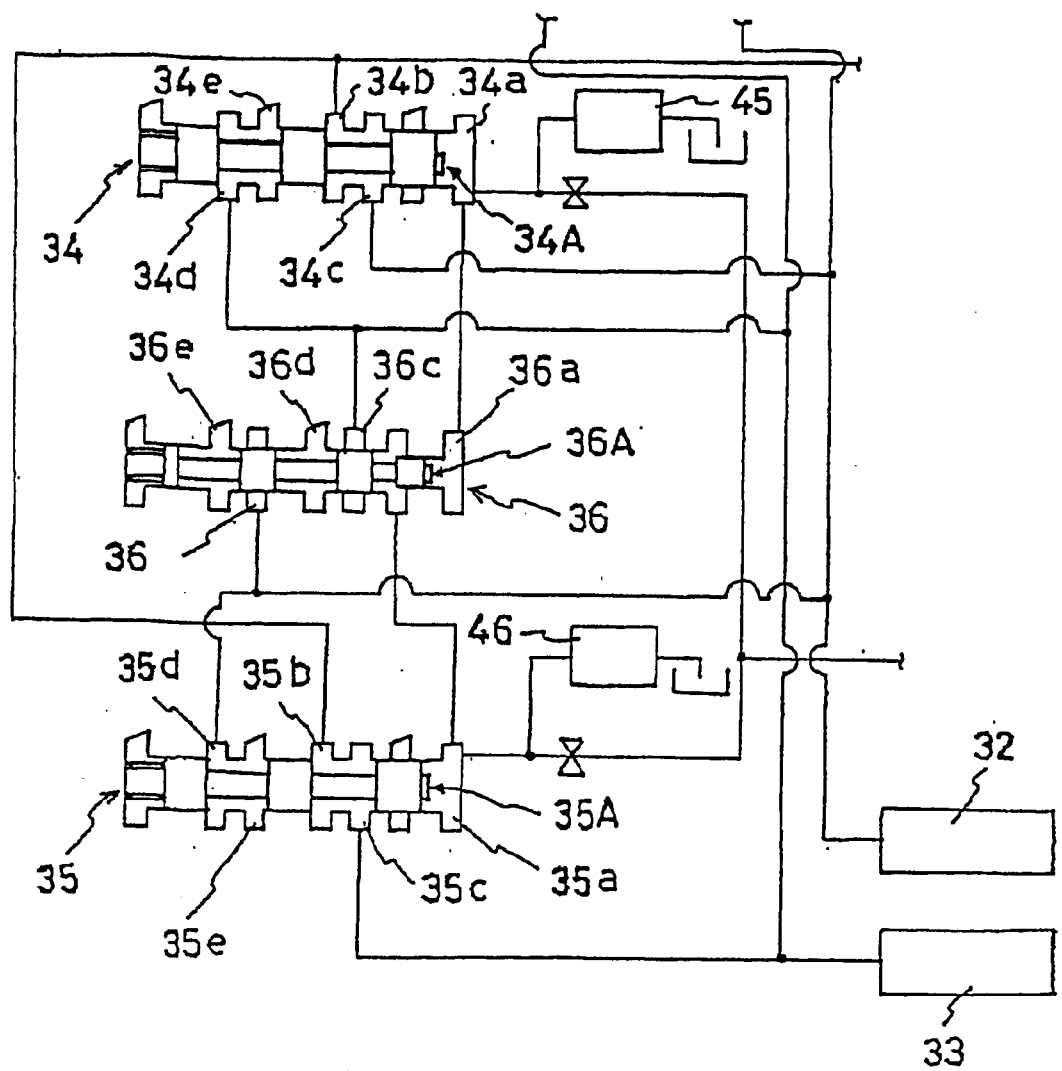
FIG. 7 is a circuit diagram of a portion of the electronically controlled power shift transmission shown in FIG. 4 showing another condition of the transmission.

When the shift lever changes from the neutral position to the reverse position in a condition in which the front shift valve 34 is in the first position, the front solenoid valve 45 is turned off, the rear solenoid valve 46 is turned on, and the pilot oil pressure 42 flows into the safety oil chamber 36a of the safety valve 36 through the rear oil chamber 35a of the rear shift valve 35, so that the rear shift valve 35 and the safety valve 36 operate in the manner shown in FIG. 7. Because the front shift valve 34 has been in the first position, the oil pressure in the rear clutch 33 is drained to the drain port 34e through the port 34d. The vehicle maintains the neutral condition because the oil pressure supplied from the second front port 34c to the front clutch 32 is drained to the drain port 35e through the port 35d. As a result, the vehicle does not move in spite of the shift lever being in the reverse position.

Therefore, the front clutch 32 and rear clutch 33 do not engage at the same time in spite of the fact that the front shift valve 34 sticks in the first position. That is, a double lock of the clutches 32, 33 does not occur.

Figure 6:
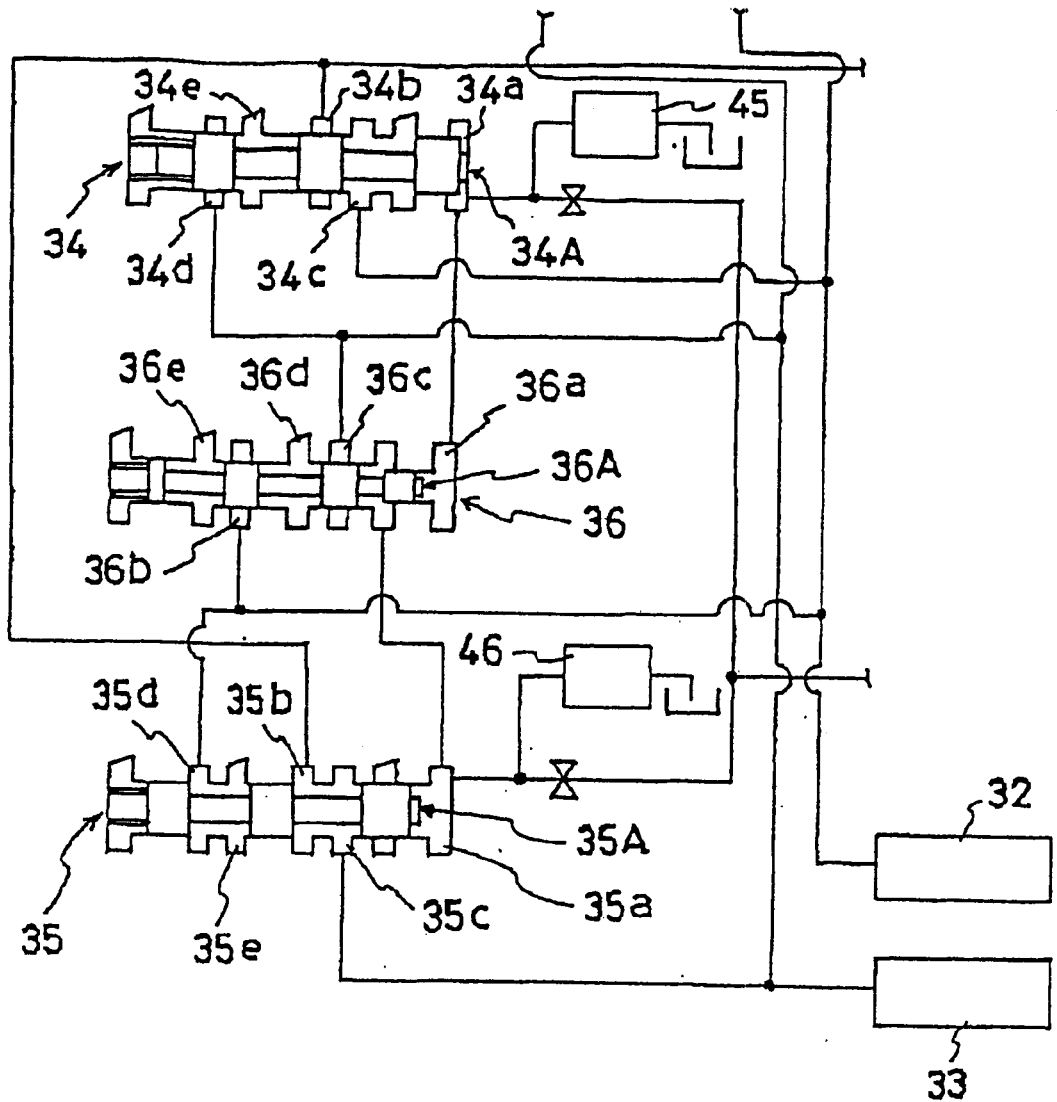
FIG. 6 is a circuit diagram of a portion of the electronically controlled power shift transmission illustrated in FIG. 4 showing another condition of the transmission.

When the shift lever changes from the neutral position to the reverse position, the rear solenoid valve 46 operates so that the pilot oil pressure 42 is supplied to the rear shift valve 35, and the front solenoid valve 45 drains the pilot oil pressure 42. Then, the pilot oil pressure 42 flows into the rear oil chamber 35a and the safety oil chamber 36a so that the rear shift valve 35 and the safety valve 36 operate as shown in FIG. 6. In the condition illustrated in FIG. 6, the line pressure 43 is supplied to the rear clutch 33 through the rear shift valve 35 and the rear clutch 33. As a result, the vehicle moves in reverse.

Figure 8:
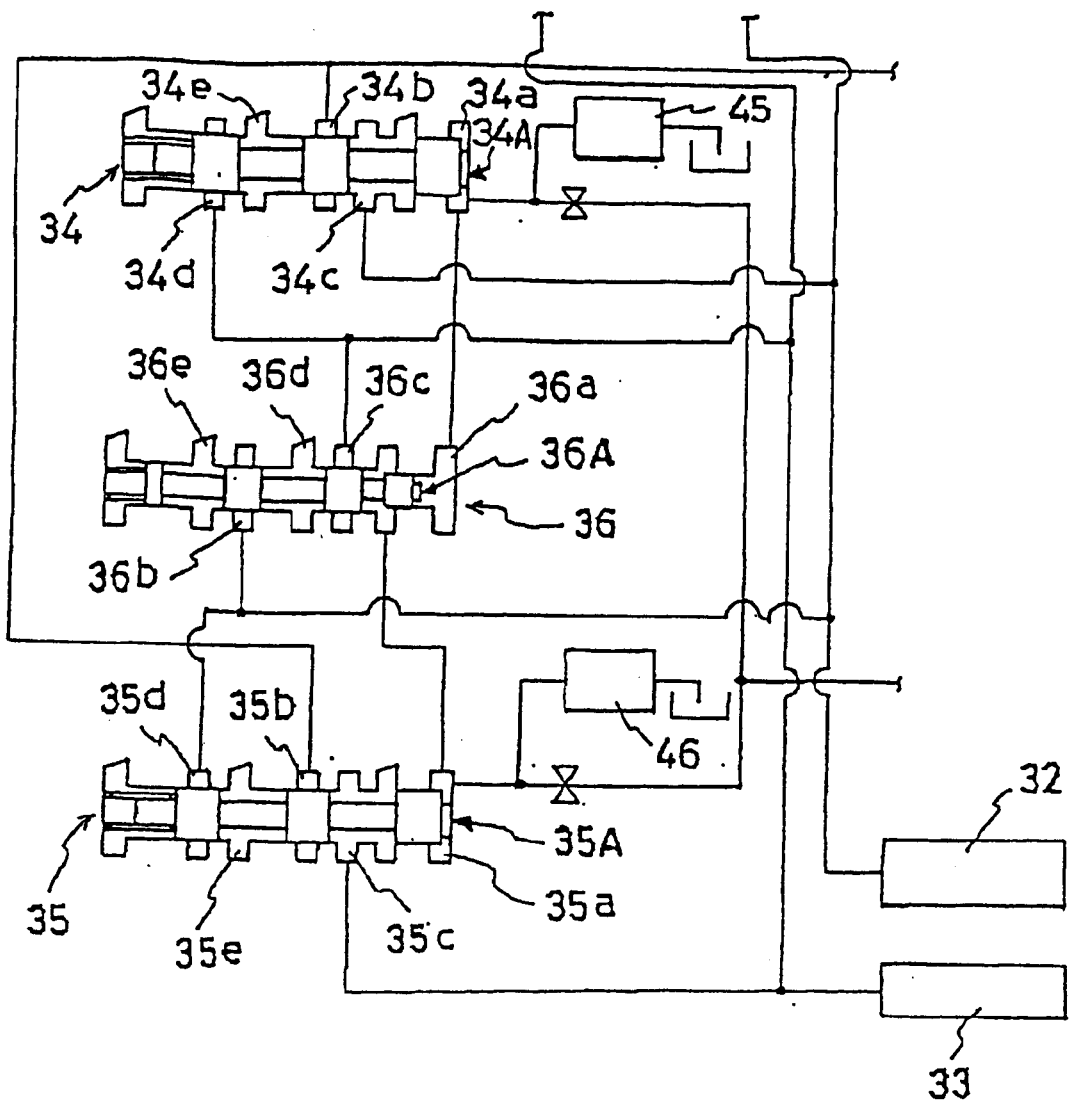
FIG. 8 is a circuit diagram of a portion of the electronically controlled power shift transmission shown in FIG. 4 showing another condition of the transmission.
Figure 9:
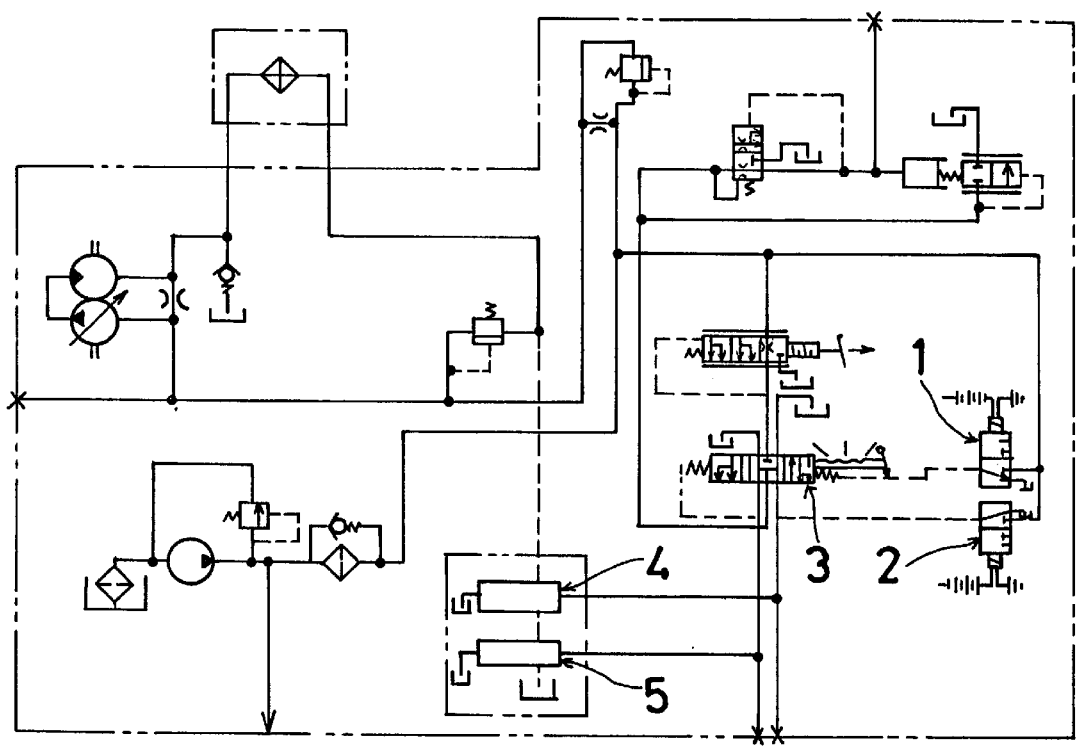
FIG. 9 is a circuit diagram of a known type of electronically controlled power shift transmission.

In case the front shift valve 34 becomes stuck in the condition shown in FIG. 6, when the shift lever changes from the reverse position to the forward position, the front solenoid valve 45 turns on and the rear solenoid valve 46 is turned off. The front shift valve 34 cannot move to the first position from the second position, but the oil pressure which is supplied to the front oil chamber 34a is supplied to the safety oil chamber 36a. As a result, the condition of each of the valves becomes that which is shown in FIG. 8 by the movement of the safety valve 36. As seen in FIG. 8, the line pressure 43 is not supplied to the front clutch 32 because the first front port 34b is not connected with the second front port 34c. The vehicle is in neutral because the oil pressure in the front clutch 32 is drained to the drain port 34f of the front shift valve 34 by way of the port 34c. Therefore, in case the front shift valve 34 sticks in the second position, the vehicle cannot move forward, but rather stays in neutral. If the position of the shift lever changes to neutral in the above condition, each of the valves 34, 35, 36 assumes the conditions shown in FIG. 4 by draining the pilot oil pressure 42 in the front oil chamber 34a. This condition does not differ from the normal condition, so the movement of the vehicle follows the position of the shift lever.

Figure 11:
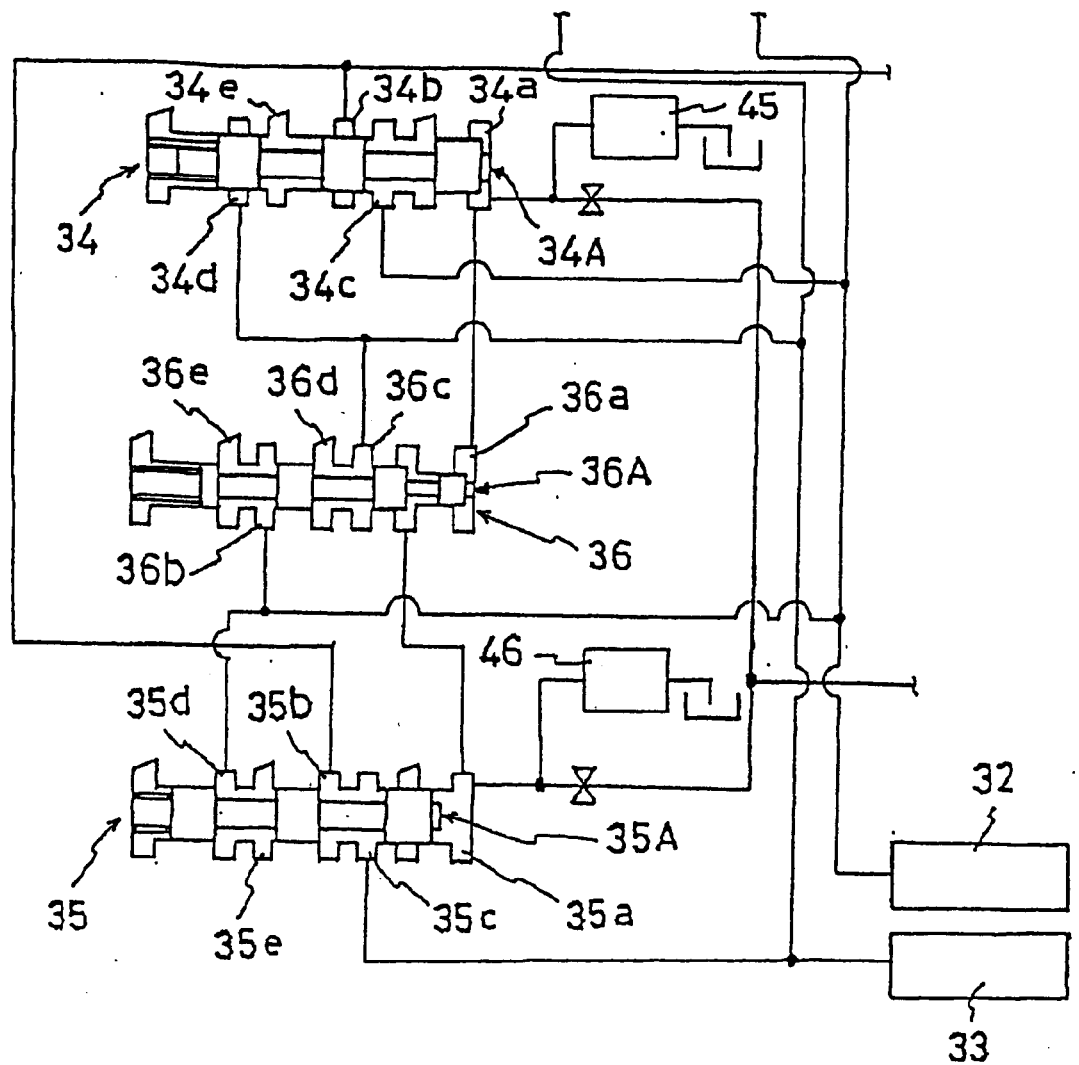
FIG. 11 is a circuit diagram of a portion of the electronically controlled power shift transmission shown in FIG. 4 showing another condition of the transmission.

The sticking of the rear shift valve 35 is explained below. When the shift lever changes to the neutral position in the situation where the rear shift valve 35 is stuck in the first position, the shift valves 34, 35 and the safety valve 36 assume the conditions shown in FIG. 11. Then, the line pressure 43 is supplied to the rear clutch 35 through the first rear port 35b and the second rear port 35c. However, the movement of the vehicle becomes neutral because the oil pressure in the rear clutch 33 is drained to the drain port 36d. Therefore, the vehicle does not move in reverse in spite of sticking of the rear shift valve 35 in the first position.

If the shift lever changes to the forward position in this condition, the shift valves 34, 35 and safety valve 36 assume the conditions shown in FIG. 7, and the oil pressure in the front clutch 32 is drained to the drain port 35e through the port 35d. Additionally, the oil pressure supplied to the rear clutch 33 from the second rear port 35c is drained to the drain port 34e through the port 34d. As a result, the vehicle does not move forward, but maintains the neutral condition in spite of the shift lever being in the forward position.

In case the rear shift valve 35 sticks in the second position, there are no problems with respect to the forward and neutral conditions of the vehicle. When the shift lever is shifted to the reverse position from the forward position, the rear shift valve 35 cannot move to the first position from the second position if the valve 35 is stuck. However, the oil pressure which is supplied to the rear oil chamber 35a is supplied to the safety oil chamber 36a, and the shift valves 34, 35 and the safety valve 36 assume the condition shown in FIG. 8. As shown in FIG. 8, the line pressure 43 is not supplied to the rear clutch 33 because of the cutting off of the connection between the first rear port 35b and the second rear port 35c, and the oil pressure in the rear clutch 33 is drained to the drain port through the second rear port 35c. Thus, the movement of the vehicle becomes neutral. Therefore, the vehicle does not move forward, but rather assumes a neutral condition in spite of the shift lever being in the reverse position.

The sticking of the safety valve 36 is explained below. In case the safety valve 36 sticks in the ON condition, the oil pressure supplied to the safety valve 36 cannot be drained. Therefore, the line pressure which is supplied to the front shift valve 34 or the rear shift valve 35 is supplied to the front clutch 32 or the rear clutch 33. That is, the position of the shift lever corresponds to the movement of the vehicle.

In case the safety valve 36 sticks in the OFF condition, the oil pressure supplied to the safety valve 36 is drained to the safety valve 36. Therefore, the movement of the vehicle is always neutral in spite of the position of the shift lever. In this condition, the vehicle cannot move, but it is safe because the vehicle does not move forward or reverse when the shift position is neutral.

A third embodiment of the present invention is explained below with reference to FIGS. 12–16. In the third embodiment, the vehicle, which can be in the from of a forklift, includes forward, neutral, and reverse shift positions.

The power shift transmission includes a shift lever (not shown) for changing the movement of the vehicle, an oil pump (not specifically shown in FIGS. 12–16, but similar to that in the embodiments described above), a front clutch 52, a rear clutch 53, a front shift valve 54, a rear shift valve 55, and a safety valve 56. The transmission also includes an inching valve, a regulator valve, an accumulator, a cooler, and a torque converter that are the same as in the first embodiment.

The front shift valve 54 has a front oil chamber 54a which supplies or cuts off the pilot oil pressure 62 from the oil pump by operation of the front solenoid valve 65. The front shift valve 54 also includes a first front port 54b connected with the safety valve 56, and a second front port 54c connected with the front clutch 52.

The rear shift valve 55 has a rear oil chamber 55a which supplies or cuts off the pilot oil pressure 62 from the oil pump by operation of the rear solenoid valve 66. The rear shift valve 55 also includes a first rear port 55b connected with the safety valve 56, and a second rear port 55c connected with the rear clutch 53.

The safety valve 56 is a spool valve which has a first safety port 56b to which the line pressure 63 is supplied, a safety oil chamber 56a connected with the front oil chamber 54a of the front shift valve 54, a drain port 56d for draining the oil pressure, and a second safety port 56c connected with the first front port 54b and the first rear port 55b.

With respect to the above power shift transmission, the front solenoid valve 65 or the rear solenoid valve 66 operate so that when the pilot oil pressure 62 is supplied to the front oil chamber 54a or the rear oil chamber 55a, the first safety port 56b is connected with the second safety port 56c. When the front solenoid valve 65 and the rear solenoid valve 66 operate so that the pilot oil pressure 62 is not supplied to the front oil chamber 54a or the rear oil chamber 55a, the safety valve 56 cuts off the connection between the first safety port 56b and the second safety port 56c, and the second safety port 56c is connected with the drain port 56d. In this third embodiment, the solenoid valve 65, 66 are normally open solenoid valves.

The operation of the third embodiment, and the relationship between the position of the shift lever, the shift valves 54, 55, the safety valve 56, and the solenoid valves 65, 66 are the same as described above and illustrated in Table 2. Thus, a description is not repeated here.

Figure 12:
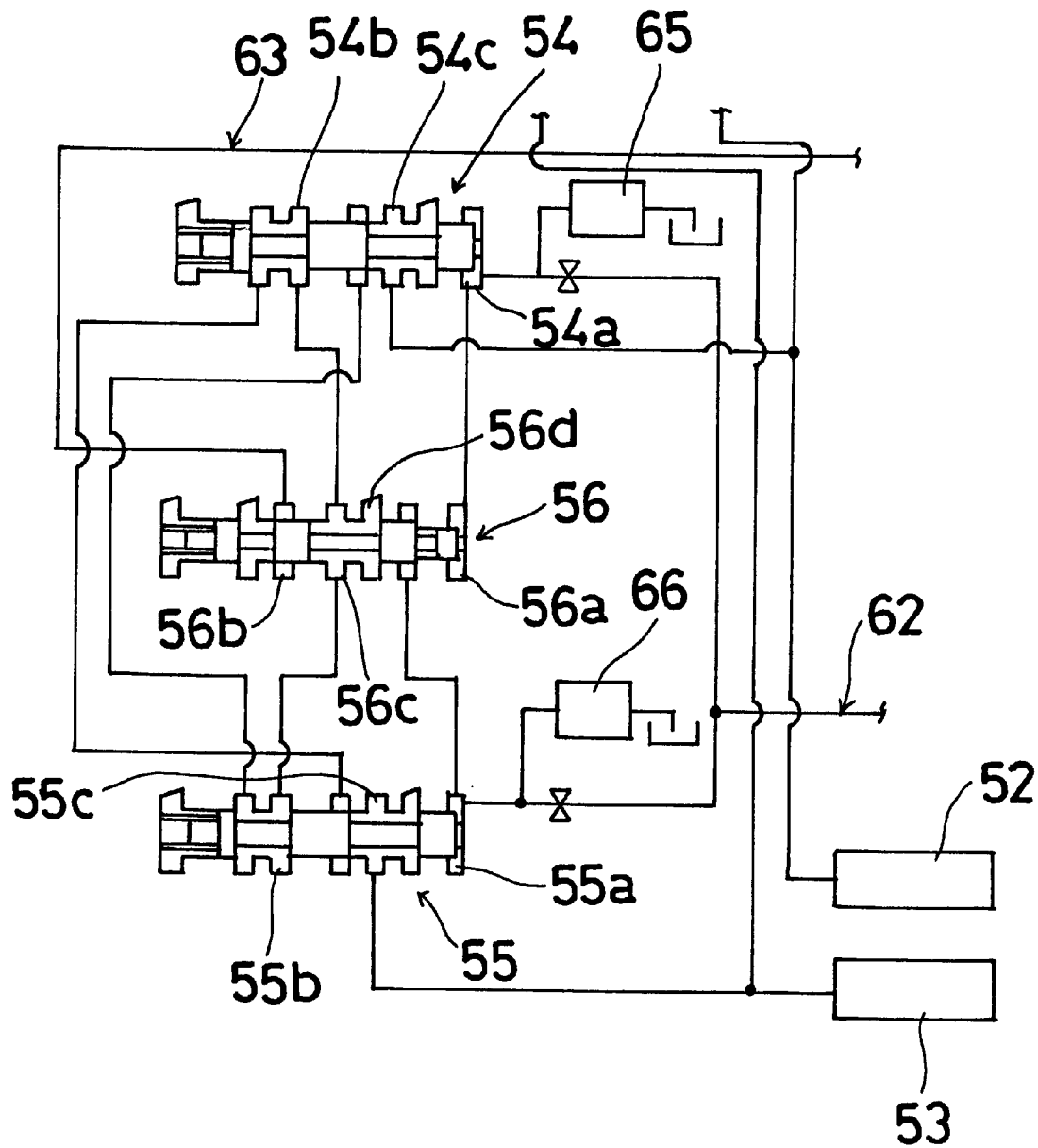
FIG. 12 is a circuit diagram of an electronically controlled power shift transmission according to a third embodiment of the present invention.

In the illustration of FIG. 12, the solenoid valves 65, 66 are not operated and the shift valves 54, 55 are in the second position. In this condition, the oil pressure is not supplied to the safety oil chamber 56a. According to FIG. 12, the line pressure 63 is not supplied to the front shift valve 54 or the rear shift valve 55 because the safety valve 56 cuts off any connection between the line pressure and the front and rear shift valves 54, 55.

Figure 13:
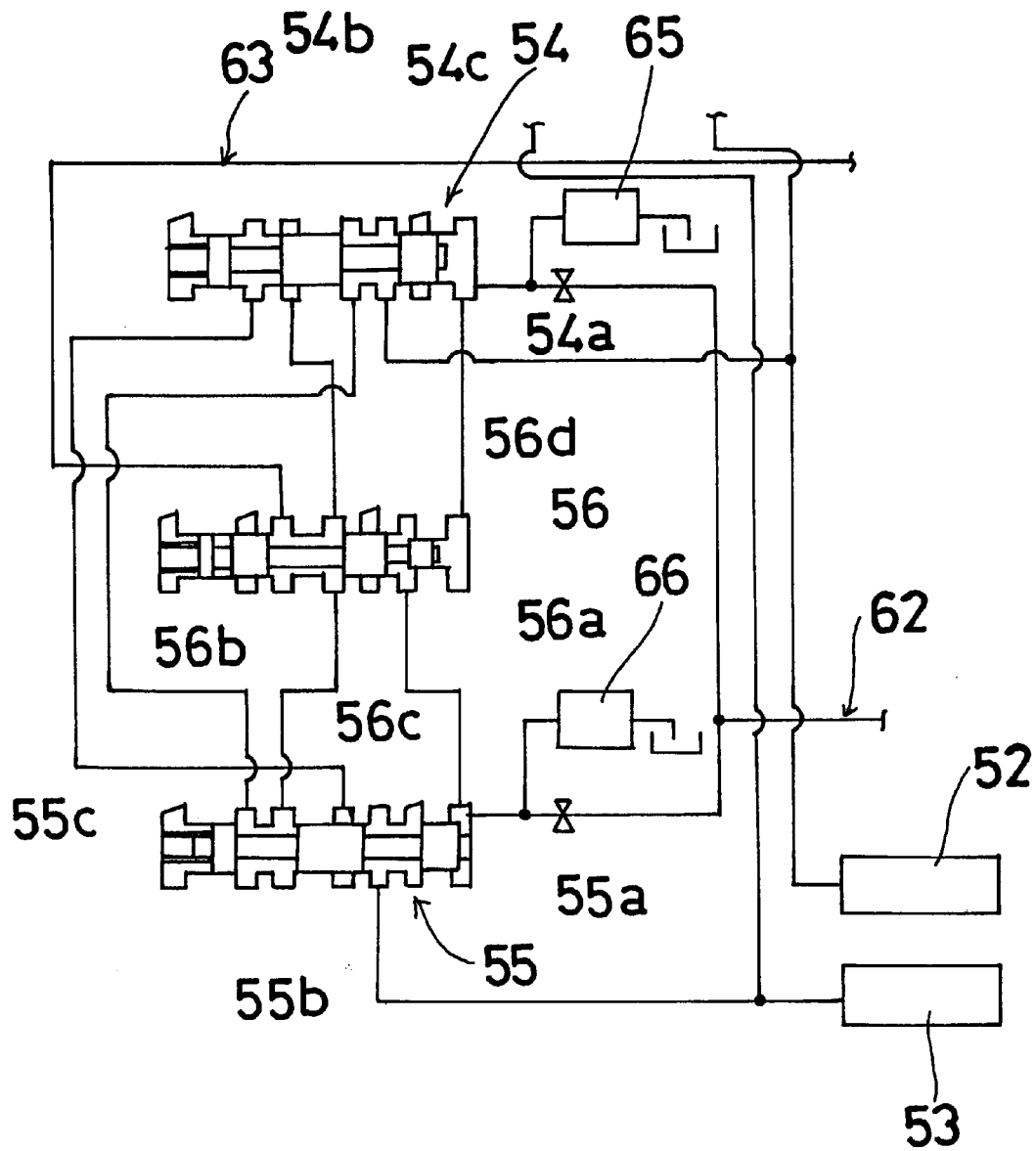
FIG. 13 is a circuit diagram of a portion of the electronically controlled power shift transmission illustrated in FIG. 12 showing one condition of the transmission.

When the front solenoid valve 65 assumes the ON position for supplying oil pressure to the front clutch 52 from the condition shown in FIG. 12, the pilot oil pressure 62 is supplied to the front oil chamber 54a and the safety oil chamber 56a, and each of the valves 54, 55, 56 assumes the condition shown in FIG. 13. Then, the line pressure 63 is supplied to the first rear port 55b from the first safety port 56b through the second safety port 56c. The line pressure 63 is supplied to the front clutch 52 from the first rear port 55b through the second front port 54c.

Figure 14:
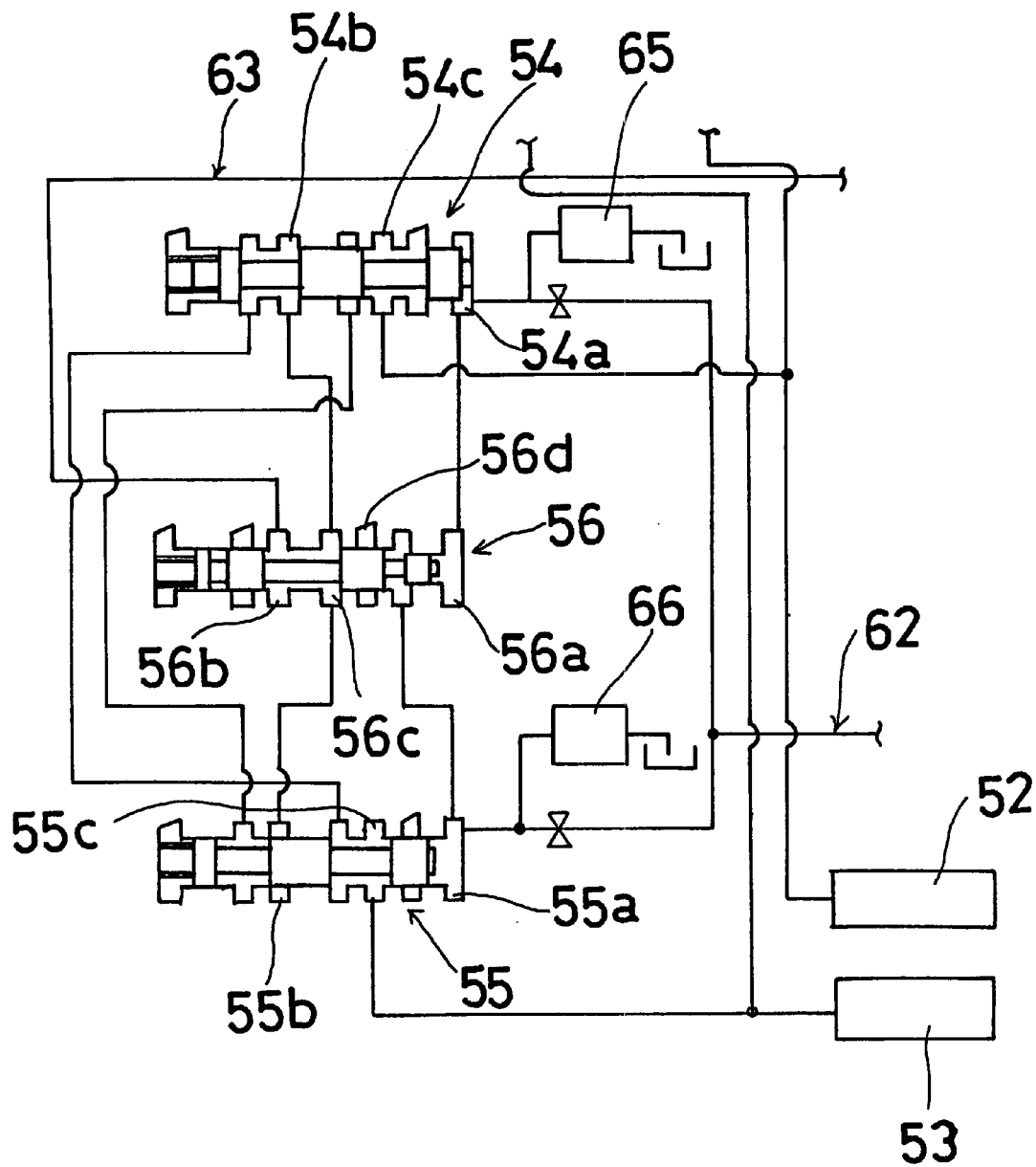
FIG. 14 is a circuit diagram of a portion of the electronically controlled power shift transmission shown in FIG. 12 showing another condition of the transmission.
Figure 15:
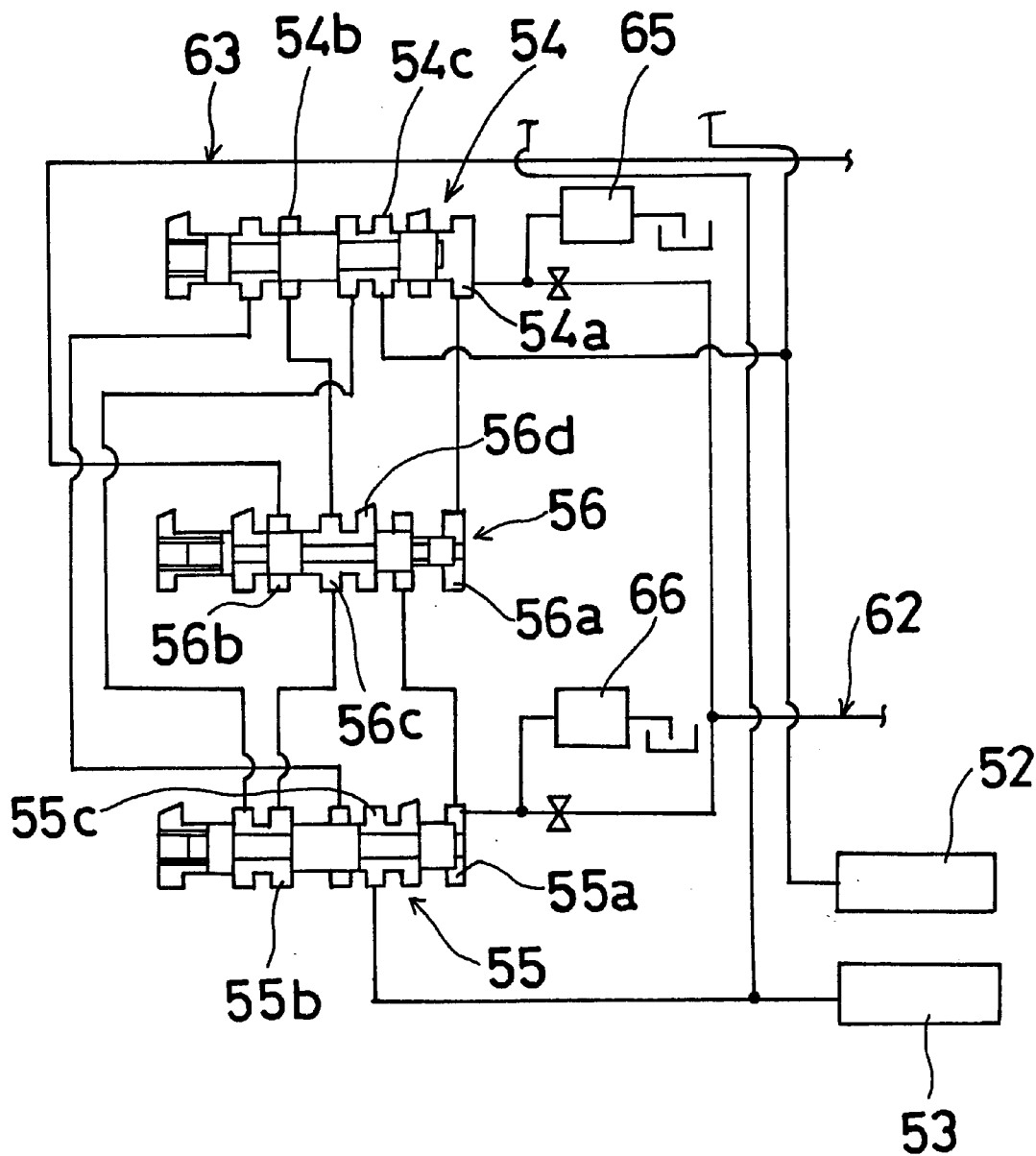
FIG. 15 is a circuit diagram of a portion of the electronically controlled power shift transmission shown in FIG. 12 showing another condition of the transmission.

When the rear solenoid valve 66 is turned ON for supplying the oil pressure to the rear clutch 53 from the condition shown in FIG. 12, the pilot oil pressure 62 is supplied to the rear oil chamber 55a and the safety oil chamber 56a, and each of the valves 54, 55, 56 assumes the condition shown in FIG. 14. Then, the line pressure 63 is supplied to the first front port 54b from the first safety port 56b through the second safety port 56c. The line pressure 63 is further supplied to the rear clutch 53 from the first front port 54b through the second rear port 55c.

When the front shift valve 54 sticks in the first position in the condition shown FIG. 13, in the situation where the position of the shift lever changes to neutral from forward, the front shift valve 54 maintains the first position even if the oil pressure is not supplied to the front oil chamber 54a by the front solenoid valve 65 being OFF. However, from the condition illustrated in FIG. 13, the valves 54, 55, 56 then assume the condition depicted in FIG. 15 because the oil pressure is not supplied to the safety oil chamber 56a. Then, the line pressure to the front clutch 52 is cut off by the first safety port 56b, and the oil pressure is not supplied to the front clutch 52. Thus, the vehicle is in a neutral condition.

Figure 16:
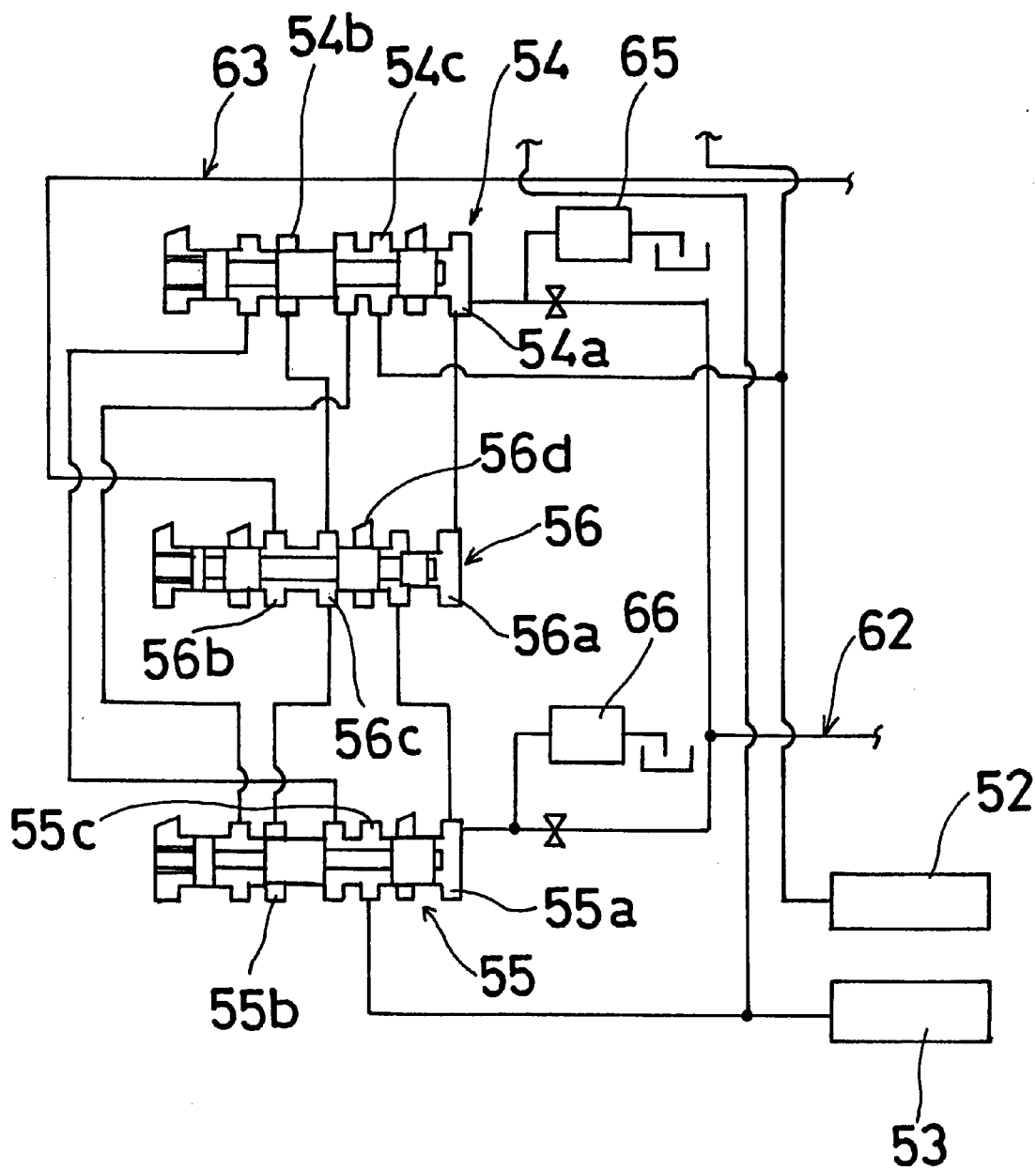
FIG. 16 is a circuit diagram of a portion of the electronically controlled power shift transmission shown in FIG. 12 showing another condition of the transmission.

When the front shift valve 54 is stuck in the first position shown in FIG. 13 in the situation where the shift lever changes to reverse from forward, the valves 54, 55, 56 assume the condition depicted in FIG. 16 because the front shift valve 54 is maintained in the first position and the oil pressure is supplied to the safety oil chamber 56a by the rear solenoid valve 66 being turned ON. The line pressure 63 is supplied to the first front port 54b and the first rear port 55b from the first safety port 56b through the second safety port 56c.

However, both shift valves 54, 55 are in the first position and so the oil pressure cannot be supplied to the clutches 52, 53 because the first front port 54b and the first rear port 55b are cut off. Therefore, the vehicle is in the neutral condition.

In connection with the third embodiment, except for the above description, the operation of the transmission in the case of sticking of the shift valves is the same as that described above in connection with the description relating to Table 2, and so such description is not repeated here. By virtue of this embodiment, as in the other embodiments, the vehicle does not move in the direction opposite the position of the shift lever when the position of the shift lever is in forward or reverse.

In the third embodiment, the oil pressure is supplied to the front clutch 52 from the safety valve 56 through the rear shift valve 55 and the front shift valve 54. According to this construction, oil pressure cannot be supplied to the front clutch 52 even if oil pressure is supplied to the rear clutch through the rear shift valve 55. Therefore, the front clutch 52 and the rear clutch 53 do not engage at the same time. That is, double locking of the clutches 52, 53 does not occur.

Figure 17:
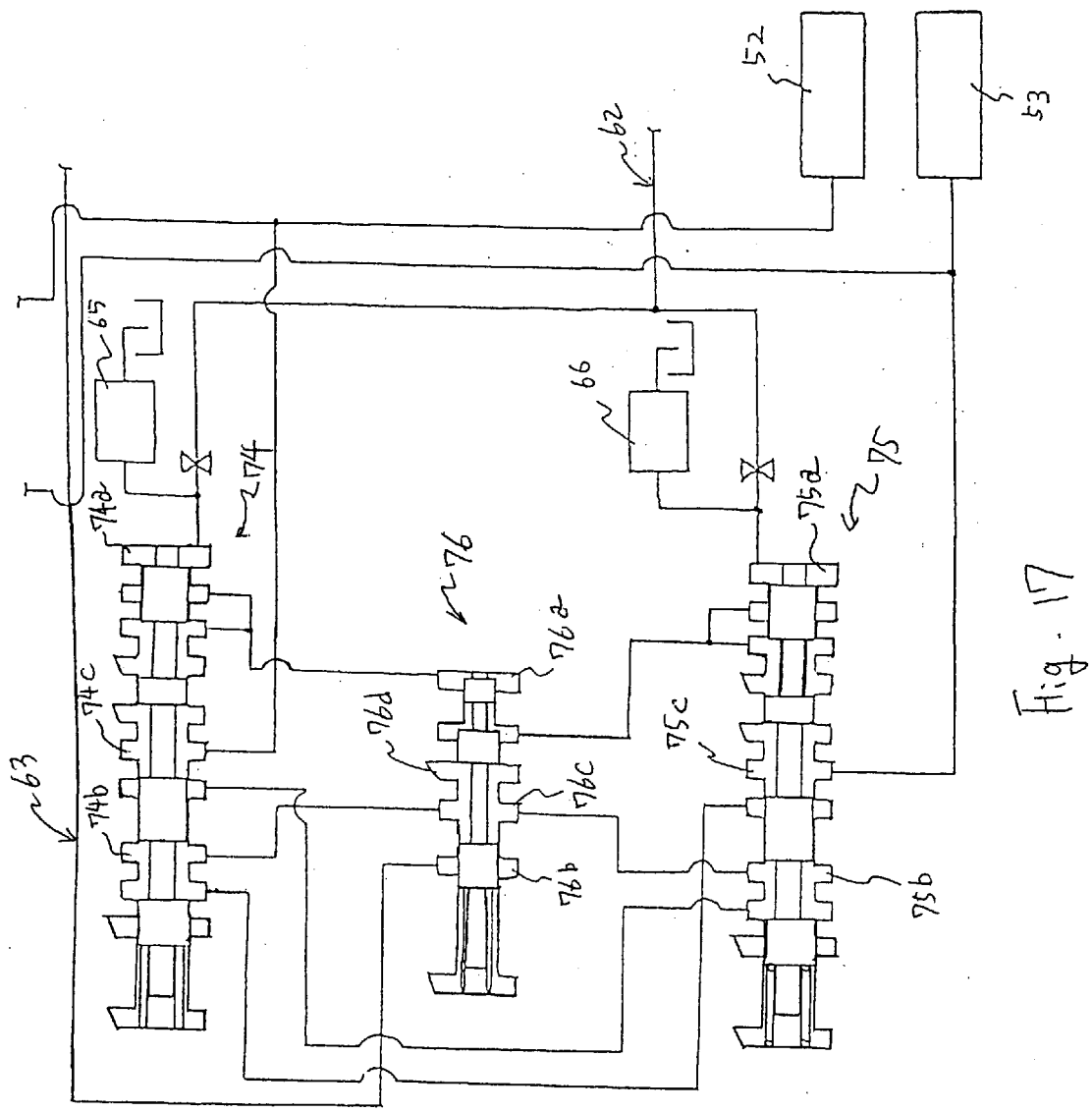
FIG. 17 is a circuit diagram of an electronically controlled power shift transmission according to a fourth embodiment of the present invention.

FIG. 17 shows an oil circuit of an electronically controlled power shift transmission according to a fourth embodiment of the present invention. In the fourth embodiment, the possible shift positions of the vehicle (e.g., a forklift) include forward, neutral, and reverse.

The power shift transmission includes many components similar those described above in connection with the third embodiment including a shift lever (not shown) for changing the movement of the vehicle, an oil pump (not specifically shown, but similar to that in the embodiments described above), a front clutch 52, a rear clutch 53, a front shift valve 74, a rear shift valve 75, and a safety valve 76. The transmission also includes an inching valve, a regulator valve, an accumulator, a cooler, and a torque converter that are the same as in the first embodiment.

The front shift valve 74 has a front oil chamber 74a which supplies or cuts off the pilot oil pressure 62 from the oil pump by operation of the front solenoid valve 65. The front shift valve 74 also includes a first front port 74b connected with the safety valve 76, and a second front port 74c connected with the front clutch 52.

The rear shift valve 75 has a rear oil chamber 75a which supplies or cuts off the pilot oil pressure 62 from the oil pump by operation of the rear solenoid valve 66. The rear shift valve 75 also includes a first rear port 75b connected with the safety valve 76, and a second rear port 75c connected with the rear clutch 53.

The safety valve 76 is a spool valve which has a first safety port 76b to which the line pressure 63 is supplied, a safety oil chamber 76a, a drain port 76d for draining the oil pressure, and a second safety port 76c connected with the first front port 74b and the first rear port 75b.

The fourth embodiment differs from the above-described third embodiment only with respect to the front shift valve 74 and the rear shift valve 75. In FIG. 17, the pilot oil pressure 62 is not supplied to the safety oil chamber 76a of the safety valve 76 unless one of the solenoid valves 65, 66 is operational because the connection between the oil chambers 74a, 75a and the safety oil chamber 76a is cut off in the condition shown in FIG. 17 in which the solenoid valves 65, 66 are non-operational. Therefore, the safety valve 76 is not influenced by the pilot oil pressure 62. The operation of the shift valves 74, 75 and the safety valve 76 is the same as that described above in connection with the third embodiment. Thus, an explanation of the operation with respect to the fourth embodiment is not repeated here.

The principles, various embodiments, and modes of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electronically controlled power shift transmission for a vehicle comprising:

an oil pressure source for generating oil pressure;

a clutch which is engageable when the oil pressure is supplied from the oil pressure source to move the vehicle;

a shift valve that is shiftable between a first position for supplying the oil pressure to the clutch and a second position for cutting off the oil pressure to the clutch;

a solenoid valve for effecting a change in the position of the shift valve between the first and second positions, and a safety valve for controlling oil flow to prevent engagement of the clutch whenever the solenoid valve operates to effect a change in the position of the shift valve to the second position, the safety valve being disposed between the shift valve and the oil pressure source, and the safety valve cutting off the shift valve from the oil pressure source when the solenoid valve operates the shift valve to the second position.

2. A electronically controlled power shift transmission for a vehicle as recited in claim 1, wherein the clutch includes a front clutch for moving the vehicle in a forward direction and a rear clutch for moving the vehicle in a reverse direction;

wherein the shift valve is a front shift valve which alternately supplies the oil pressure to the front clutch and cuts off the oil pressure to the front clutch, and including a rear shift valve which alternately supplies the oil pressure to the rear clutch and cuts off the oil pressure to the rear clutch;

the solenoid valve being a front solenoid valve for changing the position of the front shift valve, and including a rear solenoid valve for changing the position of the rear shift valve;

the front shift valve having a front oil chamber which receives the oil pressure from the oil pressure source by operation of the front solenoid valve, a first front port connected with the safety valve, and a second front port connected with the front clutch;

the rear shift valve having a rear oil chamber which receives the oil pressure from the oil pressure source by operation of the rear solenoid valve, a first rear port connected with the safety valve, and a second rear port connected with the rear clutch;

the safety valve having a first safety port for receiving the oil pressure from the oil pressure source, a safety oil chamber connected with the front oil chamber, a drain port for draining the oil pressure, and a second safety port connected with the first front port and the first rear port; and wherein when the front solenoid valve or the rear solenoid valve operate so that the oil pressure is supplied to the front oil chamber or the second oil chamber, the first safety port is connected with the second safety port, and when both the front solenoid valve and the rear solenoid valve operate so that the oil pressure is not supplied to the front oil chamber or the second oil chamber, the first safety port is cut off from the second safety port, and the second safety port is connected with the drain port.

3. An electronically controlled power shift transmission for a vehicle as recited in claim 2, wherein the oil pressure is supplied to the front clutch from the safety valve through the rear shift valve and the front shift valve.

4. An electronic controlled power shift transmission for a vehicle as recited in claim 3, wherein the oil pressure is supplied to the rear clutch from the safety valve through the front shift valve and the rear shift valve.

5. An electronically controlled power shift transmission for a vehicle comprising:

an oil pressure source for generating oil pressure;

a clutch which is engageable when the oil pressure is supplied from the oil pressure source to move the vehicle;

a shift valve that is shiftable between a first position for supplying the oil pressure to the clutch and a second position for cutting off the oil pressure to the clutch;

a solenoid operatively associated with the shift valve to effect a shift in the shift valve between the first position and the second position; and a safety valve for controlling oil flow to prevent engagement of the clutch when the shift valve is unable to move from the first position to the second position at a time when the solenoid is operated to effect a shift in the shift valve from the first position to the second position, the safety valve being disposed between the shift valve and the oil pressure source, and the safety valve cutting off the shift valve from the oil pressure source when the solenoid valve operates the shift valve to the second position.

6. A electronically controlled power shift transmission for a vehicle as recited in claim 5, wherein the clutch includes a front clutch for moving the vehicle in a forward direction and a rear clutch for moving the vehicle in a reverse direction;

wherein the shift valve is a front shift valve which alternately supplies the oil pressure to the front clutch and cuts off the oil pressure to the front clutch, and including a rear shift valve which alternately supplies the oil pressure to the rear clutch and cuts off the oil pressure to the rear clutch;

the solenoid valve being a front solenoid valve for changing the position of the front shift valve, and including a rear solenoid valve for changing the position of the rear shift valve;

the front shift valve having a front oil chamber which receives the oil pressure from the oil pressure source by operation of the front solenoid valve, a first front port connected with the safety valve, and a second front port connected with the front clutch;

the rear shift valve having a rear oil chamber which receives the oil pressure from the oil pressure source by operation of the rear solenoid valve, a first rear port connected with the safety valve, and a second rear port connected with the rear clutch;

the safety valve having a first safety port for receiving the oil pressure from the oil pressure source, a safety oil chamber connected with the front oil chamber, a drain port for draining the oil pressure, and a second safety port connected with the first front port and the first rear port; and wherein when the front solenoid valve or the rear solenoid valve operate so that the oil pressure is supplied to the front oil chamber or the second oil chamber, the first safety port is connected with the second safety port, and when both the front solenoid valve and the rear solenoid valve operate so that the oil pressure is not supplied to the front oil chamber or the second oil chamber, the first safety port is cut off from the second safety port, and the second safety port is connected with the drain port.

7. An electronically controlled power shift transmission for a vehicle as recited in claim 6, wherein the oil pressure is supplied to the front clutch from the safety valve through the rear shift valve and the front shift valve.

8. An electronic controlled power shift transmission for a vehicle as recited in claim 6, wherein the oil pressure is supplied to the rear clutch from the safety valve through the front shift valve and the rear shift valve.

9. An electronically controlled power shift transmission for a vehicle as recited in claim 5, wherein the safety valve is disposed in parallel with the shift valve between the clutch and the oil pressure source, said safety valve draining the oil pressure from the clutch when the solenoid valve operates the shift valve to the second position.

10. An electronically controlled power shift transmission for a vehicle comprising:

an oil pressure source for generating oil pressure;

a clutch which is engageable when the oil pressure is supplied from the oil pressure source to move the vehicle;

a shift valve that is shiftable between a first position for supplying the oil pressure to the clutch and a second position for cutting off the oil pressure to the clutch;

a solenoid operatively associated with the shift valve to shift the shift valve between the first position and the second position; and a safety valve located between the oil pressure source and the shift valve, said safety valve being connected to the oil pressure source for receiving oil pressure from the oil pressure source and connected to the shift valve to control the oil pressure to the shift valve, the safety valve preventing the oil pressure from the oil pressure source from reaching the shift valve when the solenoid is operated to effect a shift in the shift valve from the first position to the second position.

11. An electronically controlled power shift transmission for a vehicle as recited in claim 10, wherein the safety valve is disposed between the shift valve and the oil pressure source, and the safety valve cuts off the shift valve from the oil pressure source when the solenoid valve operates the shift valve to the first position.

12. A electronically controlled power shift transmission for a vehicle as recited in claim 10, wherein the clutch includes a front clutch for moving the vehicle in a forward direction, and including a rear clutch for moving the vehicle in a reverse direction;

wherein the shift valve is a front shift valve which alternately supplies the oil pressure to the front clutch and cuts off the oil pressure to the front clutch, and including a rear shift valve which alternately supplies the oil pressure to the rear clutch and cuts off the oil pressure to the rear clutch;

the solenoid valve being a front solenoid valve for changing the position of the front shift valve, and including a rear solenoid valve for changing the position of the rear shift valve;

the front shift valve having a front oil chamber which receives the oil pressure from the oil pressure source by operation of the front solenoid valve, a first front port connected with the safety valve, and a second front port connected with the front clutch;

the rear shift valve having a rear oil chamber which receives the oil pressure from the oil pressure source by operation of the rear solenoid valve, a first rear port connected with the safety valve, and a second rear port connected with the rear clutch;

the safety valve having a first safety port for receiving the oil pressure from the oil pressure source, a safety oil chamber connected with the front oil chamber, a drain port for draining the oil pressure, and a second safety port connected with the first front port and the first rear port; and wherein when the front solenoid valve or the rear solenoid valve operate so that the oil pressure is supplied to the front oil chamber or the second oil chamber, the first safety port is connected with the second safety port, and when both the front solenoid valve and the rear solenoid valve operate so that the oil pressure is not supplied to the front oil chamber or the second oil chamber, the first safety port is cut off from the second safety port, and the second safety port is connected with the drain port.

13. An electronically controlled power shift transmission for a vehicle as recited in claim 12, wherein the oil pressure is supplied to the front clutch from the safety valve through the rear shift valve and the front shift valve.

14. An electronic controlled power shift transmission for a vehicle as recited in claim 12, wherein the oil pressure is supplied to the rear clutch from the safety valve through the front shift valve and the rear shift valve.

\* \* \* \* \*